(12) United States Patent
Kitazawa et al.

(10) Patent No.: US 7,295,504 B2
(45) Date of Patent: Nov. 13, 2007

(54) BEAM SHAPING ELEMENT, AND LIGHT SOURCE UNIT AND OPTICAL PICKUP USING SAME

(75) Inventors: Tazuko Kitazawa, Tenri (JP); Tetsuo Iwaki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 429 days.

(21) Appl. No.: 10/374,849

(22) Filed: Feb. 25, 2003

(65) Prior Publication Data

US 2003/0169669 A1   Sep. 11, 2003

(30) Foreign Application Priority Data

Mar. 4, 2002 (JP) ............................. 2002-057994
Feb. 5, 2003 (JP) ............................. 2003-028606

(51) Int. Cl.
*G11B 7/00* (2006.01)

(52) U.S. Cl. ..................... 369/112.03; 369/112.01; 359/563

(58) Field of Classification Search ........... 369/112.07, 369/112.12; 359/563, 569, 575
See application file for complete search history.

(56) References Cited

U.S. PATENT DOCUMENTS

| | | | | |
|---|---|---|---|---|
| 4,731,772 A | * | 3/1988 | Lee ........................... | 369/44.14 |
| 5,253,237 A | * | 10/1993 | Miyake et al. ............ | 369/44.37 |
| 5,436,876 A | | 7/1995 | Yokoyama et al. | |
| 5,673,241 A | * | 9/1997 | Koyama et al. .......... | 369/44.23 |
| 5,726,436 A | * | 3/1998 | Oka et al. ................. | 250/201.5 |
| 5,969,864 A | * | 10/1999 | Chen et al. ................ | 359/569 |
| 6,252,686 B1 | * | 6/2001 | Ando ......................... | 359/15 |
| 6,487,015 B2 | * | 11/2002 | Kitamura et al. .......... | 359/558 |

FOREIGN PATENT DOCUMENTS

| | | |
|---|---|---|
| JP | 7-192298 A | 7/1995 |
| JP | 8-212566 A | 8/1996 |
| WO | WO98/50913 | 11/1998 |

* cited by examiner

*Primary Examiner*—William R. Korzuch
*Assistant Examiner*—Tawfik Goma
(74) *Attorney, Agent, or Firm*—Edwards Angell Palmer & Dodge LLP; David G. Conlin, Esq.; William J. Daley, Jr. Esq.

(57) ABSTRACT

A beam shaping element includes a set of diffraction gratings on each surface thereof, in such a manner that intervals between the gratings farer from a vicinity of an optical axis and nearer to a periphery are narrower, wherein each interval between the respective gratings monotonously increases or monotonously decreases along a direction in which each grating-shaped pattern extends. According to the arrangement above, it is possible to correct displacement of a light emitting point of a light source by simply performing a positional adjustment within a plane that is orthogonal to the optical axis. Thus, it is possible to provide the beam shaping element that enables to correct the displacement of the light emitting point of the light source simply by performing positional adjustment in the plane vertical to the optical axis, thereby making it unnecessary to perform positional adjustment along the optical axis direction, and to provide a light source unit and an optical pickup using the beam shaping element.

21 Claims, 13 Drawing Sheets

XY PLANE SURFACE

XZ PLANE SURFACE

XY PLANE SURFACE

XZ PLANE SURFACE

YZ PLANE SURFACE

BEAM SHAPING ELEMENT, AND LIGHT SOURCE UNIT AND OPTICAL PICKUP USING SAME

FIELD OF THE INVENTION

The present invention relates to a beam shaping element for shaping a light beam having an elliptical shape cross-section into a substantially round shape, and a light source unit and an optical pickup including the beam shaping element.

BACKGROUND OF THE INVENTION

Information storage mediums such as optical disks have been improved to have high density so as to attain larger storage capacity. In order to realize high density in a disk-shaped information storage medium such as an optical disk, it is necessary to reduce a spot diameter of a light beam condensed onto the optical disk. However, a light beam is radiated from a semiconductor laser element, which is typically used as a light source, in such a manner that a radiation angle in a direction vertical to a composition surface of a laser chip (vertical direction) and a radiation angle in a direction horizontal to the composition surface of the laser chip (horizontal direction) are different. The radiation angle in the vertical direction is about twice to three times larger than the radiation angle in the horizontal direction. Therefore, light volume of the light beam cannot be efficiently used if the light beam is condensed directly, because the light beam makes an elliptical shape spot when the light beam is condensed directly. Moreover, a focal point in the horizontal direction and a focal point in the vertical direction do not match if the light beam is condensed directly, because positions of a light emitting point are actually different (displacement of an actual light emitting point).

To solve the problems above, as shown in FIG. 13, a method for shaping the spot of the light beam into a substantially round shape is suggested, in which a shaping prism 18 is provided on an optical path of a light beam 11 radiated from a semiconductor laser element (not shown) in order to expand the light beam in one direction or narrow the light beam in one direction by the shaping prism 18. According to the arrangement above, however, there is a problem that an optical pickup as a whole becomes large because a size of the shaping prism 18 cannot be sufficiently reduced, and because at least two shaping prisms 18 must be used in order to keep the optical path of the light beam 11 parallel before and after the light beam 11 is shaped.

Thus, WO98/50913 (Publication Date: Nov. 12, 1998), as shown in FIGS. 14 and 15, suggests a method for matching a beam diameter in the horizontal direction with a beam diameter in the vertical direction. In the method, the beam diameter in the horizontal direction is matched with the beam diameter in the vertical direction by using a shaping element 19 including two holograms 20 in order to change the radiation angles of the light beam 11. According to the arrangement above, it is possible to shape the light beam 11 having an elliptical shape cross-section into a substantially round shape by adjusting a position of the shaping element 19 in a plane vertical to an optical axis and along the optical axis direction. Moreover, it is possible to reduce a size of the optical pickup as a whole because the shaping element 19 is an optical element having a plain plate shape.

However, according to the art disclosed in above WO98/50913, patterns of the holograms 20 of the shaping element 19 are in oval shape. Thus, the position of the shaping element 19 must be adjusted in a horizontal direction and in a perpendicular direction in the plane vertical to the optical axis in order to match the shaping element 19 with the optical axis of the semiconductor laser.

Moreover, it is necessary to adjust distance between the shaping element 19 and the semiconductor laser in accordance with property of each semiconductor laser because each semiconductor laser produced has different wavelength and amount of displacement of the actual light emitting point, thereby causing inter-individual errors (inter-individual unevenness). In other words, it is necessary to perform positional adjustment along the optical axis direction, in addition to the positional adjustment in the horizontal direction and in the perpendicular direction in the plane vertical to the optical axis. Thus, the positional adjustment must be performed in three directions in total.

Hence, the shaping element 19 of WO98/50913 must include a jig for moving the shaping element 19 in the optical axis direction in addition to a jig for moving the shaping element 19 in directions in the plane vertical to the optical axis. Similarly, when the shaping element 19 and the semiconductor laser element are unitized, it is necessary to adjust the distance between the shaping element 19 and the semiconductor laser element on a package (that is the positions of the shaping element 19 and the semiconductor laser element in the optical axis direction) in accordance with the amount of displacement of the apparent light emitting point of each semiconductor laser.

In short, for example, when a combination of the shaping element 19 and the semiconductor laser element (e.g. the optical pickup) is used, there is a problem that time and costs for the positional adjustment in the optical axis direction are needed irrespective of whether or not the shaping element 19 and the semiconductor laser element are unitized.

SUMMARY OF THE INVENTION

In light of the conventional problems above, an object of the present invention is to provide a beam shaping element that enables to correct displacement of a light emitting point of a light source simply by performing positional adjustment in the plane vertical to an optical axis, thereby making it unnecessary to perform positional adjustment along an optical axis direction and to provide a light source unit and an optical pickup using the beam shaping element.

To attain the object above, the beam shaping element of the present invention includes a set of diffraction gratings having intervals which become narrower as locations of the gratings corresponding thereto become farer from a vicinity of an optical axis and nearer to a periphery, each interval of the set of diffraction gratings being so formed as to change along a direction in which each grating-shaped pattern extends.

According to the arrangement above, it is possible to provide the beam shaping element that enables to correct the displacement of the light emitting point of the light source simply by performing positional adjustment in the plane vertical to the optical axis, thereby making it unnecessary to perform positional adjustment along the optical axis direction.

In the present invention, "displacement of the light emitting point" collectively refers to "displacement of the apparent light emitting point", which is caused by a central wavelength of the light source used and amount of displacement (hereinafter amount of displacement of the actual light source) in different directions of the light source (e.g. the vertical direction and the horizontal direction) and the like.

It is desired that the "displacement of the light emitting point" be reduced by correction as much as possible because the "displacement of the light emitting point" causes blurring of a spot when a light beam is condensed.

To attain the object above, it is more preferable that the beam shaping element of the present invention includes, in the arrangement above, a set of diffraction gratings having intervals which become narrower as locations of the gratings corresponding thereto become farer from a vicinity of an optical axis and nearer to a periphery, each interval of the set of diffraction gratings being so formed as to monotonously increase or monotonously decrease along a direction in which each grating-shaped pattern extends.

According to the arrangement above, it is more easy to correct the displacement of the light emitting point of the light source that emits the light beam can more easily be corrected.

To attain the object above, a positional adjustment method of the present invention for performing positional adjustment of the beam shaping element described in one of the inventions above and a light source for radiating a light beam into the beam shaping element includes the steps of (i) keeping constant distance between the beam shaping element and the light source, (ii) moving the light source relatively along a direction towards inside a surface of the beam shaping element, and (iii) correcting displacement of a light emitting point. In the positional adjustment method, it is sufficient that at least one of the light source and the beam shaping element is actually moved in order to move the light source relatively to the beam shaping element.

According to the method above, it is possible to provide the positional adjustment method that enables to correct the displacement of the light emitting point of the light source simply by performing positional adjustment of the light source and the beam shaping element within the surface, thereby making it unnecessary to adjust distance between the light source and the beam shaping element.

To attain the object above, a light source unit of the present invention includes the beam shaping element described in one of the inventions above and a light source for radiating a light beam into the beam shaping element, positions of which are adjusted by the above positional adjustment method.

According to the arrangement above, it is possible to provide the light source unit which is easy to assemble and highly reliable.

To attain the object above, an optical pickup of the present invention includes (a) a light source for radiating a light beam in an elliptical shape, (b) a beam shaping element, into which the light beam from the light source is radiated, described in one of the inventions above, (c) a collimating means for parallelizing and integrating the light beam shaped into the substantially round shape by the beam shaping element, and (d) a collecting means for collecting the light beam parallelized and integrated by the collimating means.

According to the arrangement above, it is possible to collect the light beam radiated from the light source by the collimating means as a spot having a substantially round shape, and to provide the optical pickup that does not require a moving mechanism for moving the beam shaping element or the light source along the optical axis direction in order to correct the displacement of the light source.

For a fuller understanding of the nature and advantages of the invention, reference should be made to the ensuing detailed description taken in conjunction with the accompanying drawings.

DESCRIPTION OF THE EMBODIMENTS

Figure 1:
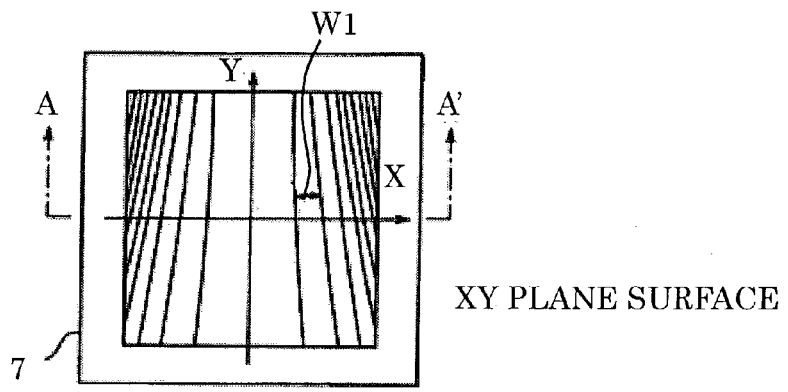
FIG. 1(a) is a front view of a beam shaping element of the present invention seen in an optical axis direction.
FIG. 1(b) is a cross-sectional view taken along line A-A' of the beam shaping element.
FIG. 1(c) is a back view of the beam shaping element seen from the reverse side of FIG. 1(a).
Figure 1:
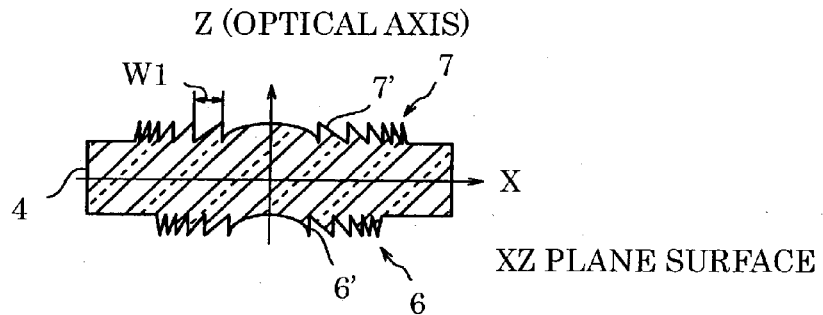
Figure 1:
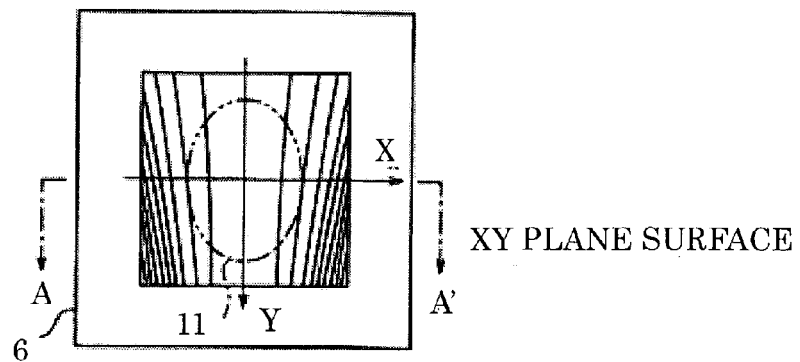

Referring to the drawings, the following describes an embodiment of the present invention. The scope of the present invention is not particularly limited within the scope of the embodiment hereinafter described.

[Beam Shaping Element and Positional Adjustment Method for Same]

As shown in FIG. 1(b), a beam shaping element 4 of the present invention is so arranged as to have a first set of diffraction gratings 6 on one of two surfaces of a substrate transparent (e.g. a glass substrate) at a wavelength of a light beam radiated from a light source used (e.g. a semiconductor laser) and a second set of diffraction gratings 7 on the other of the two surfaces of the transparent substrate. Both the set of diffraction gratings 6 and the set of diffraction gratings 7 are arranged in such a manner that intervals W1 farer from a vicinity of an optical axis (the Z-axis) and nearer to a periphery are narrower, wherein each interval between the respective gratings monotonously increase or monotonously decrease along a direction in which grating-shaped patterns 6' and 7' extends. The intervals W1 referred to here indicate distance between corresponding foots of neighboring grating-shaped patterns 6' and 6' (7' and 7'), in other words, between neighboring grating grooves.

The following more specifically describes the arrangements of the set of diffraction gratings 6 and the set of diffraction gratings 7 with reference to FIGS. 1(a) to (c).

FIG. 1(a) shows the beam shaping element 4 seen from a surface on which the second set of diffraction gratings 7 is formed; FIG. 1(c) shows the beam shaping element 4 seen from a surface on which the first set of diffraction gratings 6 is formed. In FIGS. 1(a) to 1(c), X-Y-Z coordinates are assumed as follows: the origin (O) is a center of the beam shaping element 4; the Z-axis is a direction of an optical axis passing through the origin; the Y-axis is an axis of symmetry of a plurality of grating-shaped patterns 6' forming the first set of diffraction gratings 6; and the X-axis is an axis passing through the origin that is orthogonal to the Y-axis. The Y-axis is also a symmetrical axis of a plurality of grating-shaped patterns 7' forming the second set of diffraction gratings 7.

Although it is assumed that the origin (O) is the center of the be-am shaping element 4 in the present embodiment, it is not always necessary to assume that the origin is the center of the beam shaping element 4. For example, when it is assumed that the origin is a point off the center of the beam shaping element 4, an area where no grating-shaped pattern is shaped around the first set of diffraction gratings 6 and the second set of diffraction gratings 7 becomes asymmetrical with respect to the Y-axis or the X-axis.

Into the beam shaping element 4, a light beam 11 from a light source (not shown) enters in a substantially elliptical shape. [see FIG. 1(c)]. Thus, when the light beam 11 is radiated so that a minor axis thereof having the substantially elliptical shape is kept parallel to an X-axis direction (in other words, when the light beam 11 is radiated so that a major axis thereof is kept parallel to a Y-axis direction), as in an ordinary beam shaping element, the radiation angle of the light beam 11 is practically not shaped in the Y-axis direction, while the radiation angle of the light beam 11 is expanded (shaped) in the X-axis direction. In other words, the X-axis direction is equivalent to a shaping direction of the light beam 11, while the Y-axis direction is equivalent to a non-shaping direction of the light beam 11.

The sets of diffraction gratings 6 and 7 of the beam shaping element 4 are, as shown by FIG. 1(b) illustrating a cross-section taken along line A-A' (see FIGS. 1(a) and 1(c)), composed of the grating-shaped patterns 6' and 7' having triangular cross-sections. The grating-shaped patterns 6' and 7' are plural in number and arrayed in the X-axis direction. Both the sets of diffraction gratings 6 and 7 have such intervals W1 that the intervals W1 that are located in the periphery are narrower than the intervals W1 that are located in the vicinity of the optical axis with respect to the X-axis direction that is the shaping direction.

Furthermore, when the beam shaping element 4 is seen from the optical axis direction, the intervals W1 of both the sets of diffraction gratings 6 and 7 monotonously decrease along an increasing direction of a value y (the direction in which the grating-shaped patterns extend, which is the non-shaping direction). Because of this, the radiation angle of the light beam 11 varies depending on the position corresponding to the value y.

In other words, according to the above arrangement of the sets of diffraction gratings 6 and 7, different areas of each of the grating-shaped patterns 6' and 7' radiate the incident light beam 11 in a different radiation angle because each interval W1 changes along the direction (the non-shaping direction). Consequently, when a position at which the light beam 11 enters (a position of incidence) moves along the non-shaping direction, an apparent light emitting point seen from the non-shaping direction moves. As a result, with respect to a light source (not shown) that radiates the light beam 11, corrected is displacement between the light emitting point seen from the shaping direction and the apparent light emitting point seen from the non-shaping direction. In other words, simply by performing positional adjustment in the plane vertical to the optical axis, it is possible to correct the displacement of the light emitting point of the light source, thereby providing a beam shaping element 4 which requires no positional adjustment along the optical axis (adjustment as to distance between the light source and the beam shaping element).

In both the sets of diffraction gratings 6 and 7 having the arrangement above, monotone changes of the intervals W1 along a direction in which the value y increase gradually varies from monotonously decrease to monotonously increase as locations of the gratings corresponding thereto become farer from the vicinity of the optical axis (the Z-axis) and nearer to the periphery. That is, the intervals W1 between the gratings 6 and 7 located near the optical axis monotonously decrease in the increasing direction of the value y, where rate of the monotone decrease gradually decreases as locations of the gratings 6 and 7 corresponding thereto become farer. Then, at a certain W1, the monotone decrease is changed into monotone increase. Thus, the intervals W1 located near the periphery monotonously increase. The monotonously change of the intervals W1 along the direction in which the value y increases may gradually vary from monotonously increase to monotonously decrease as locations of the gratings corresponding thereto become farer from the vicinity of the optical axis and nearer to the periphery. The monotonously change of the intervals W1 along the direction in which the value y increases may continually change as locations of the gratings corresponding thereto become farer from the vicinity of the optical axis and nearer to the periphery and, as a result, remain being monotone decrease or monotone increase.

Figure 2:
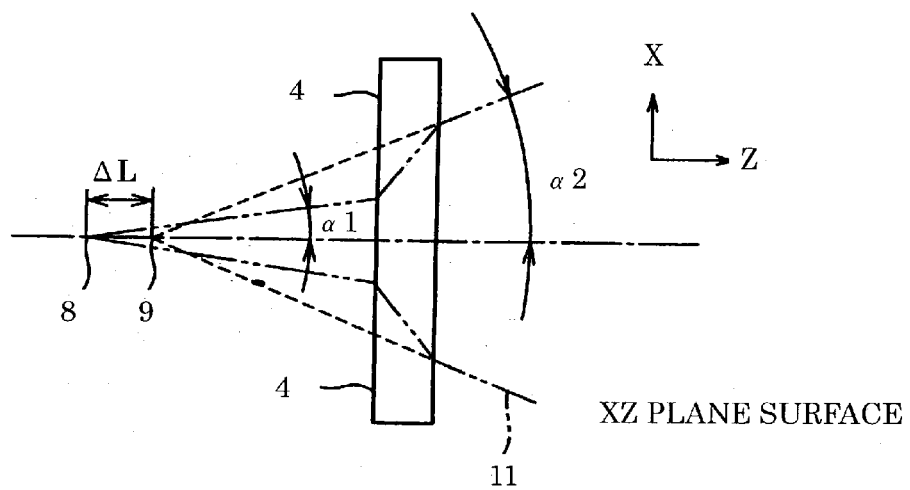
FIG. 2 is a cross-sectional view in a shaping direction illustrating the beam shaping element of the present invention and a light beam passing through the beam shaping element.
Figure 3:
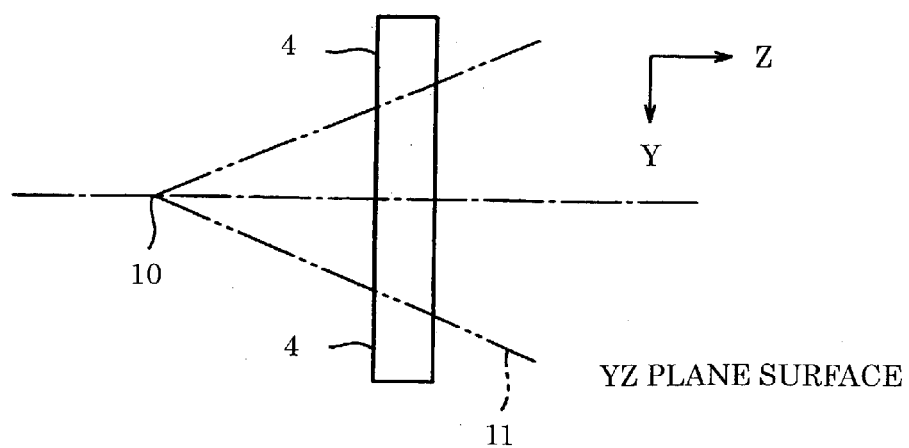
FIG. 3 is a cross-sectional view in a non-shaping direction illustrating the beam shaping element of the present invention and the light beam passing through the beam shaping element.
Figure 4:
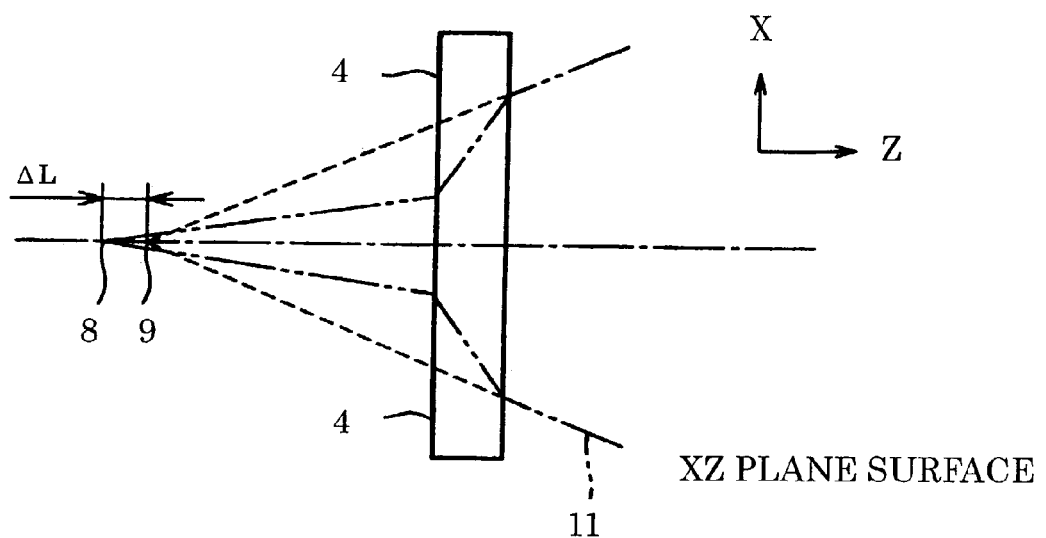
FIG. 4 is a cross-sectional view in the shaping direction illustrating the beam shaping element of the present invention and the light beam passing through the beam shaping element when the beam shaping element of the present invention is moved in the non-shaping direction.

The following specifically describes a method for shaping the light beam 11 having an elliptical shape cross-section into a substantially round shape by using the beam shaping element 4 and adjusting displacement of a light emitting point of a light source (a positional adjustment method for the beam shaping element and a light source) referring to FIGS. 2 to 4.

When the light beam 11 having a cross-section of substantially round shape is radiated into the beam shaping element 4, almost no change in the radiation angle is caused in the non-shaping direction due to transmission of the light beam 11 through the beam shaping element 4 (see FIG. 3).

In the shaping direction, on the other hand, as shown by a chain double-dashed line in FIG. 2, the radiation angle of the light beam 11 is widen by the first set of diffraction gratings 6 on a surface into which the light beam 11 enters (a surface of incidence), and the beam diameter of the light beam 11 becomes substantially the same with the beam diameter in the non-shaping direction when the light beam reaches the second set of diffraction gratings 7 on a surface from which light beam 11 is radiated (a surface of outgoing radiation). Then, the radiation angle of the light beam 11 is narrowed by the second set of diffraction gratings 7 and radiated in a radiation angle that is almost the same as a radiation angle in the non-shaping direction.

Because of this, the light beam 11 is radiated from the second set of diffraction gratings 7 in a substantially round-shape, having substantially the same beam diameters and radiation angles in the shaping direction and in the non-shaping direction. Here, an apparent light emitting point 9 of the light beam 11 after the shaping is displaced from an actual light emitting point 8 in the shaping direction of the light beam 11 as shown by the dotted line in FIG. 2. Then, a variation Δ1 caused by the displacement cancels out displacement between the actual light emitting point 8 and a light emitting point 10 in the non-shaping direction shown in FIG. 3.

The following describes a case in which the beam shaping element 4 is moved, from where the beam shaping element is located as shown in FIGS. 2 and 3, along the Y-axis direction [the non-shaping direction, see FIGS. 1(a) to 1(c)].

The intervals W1 of the sets of diffraction gratings 6 and 7 of the beam shaping element 4 monotonously decreases along the increase direction of the value y. Thus, when the beam shaping element 4 is moved along the Y-axis so that the center of the light beam 11 has a positive y value, the variation Δ1, which is the change of the apparent light emitting point 9 of the light beam 11 after the shaping in relation to the actual light emitting point 8 in the shaping direction of the light beam 11, becomes larger compared with the variation Δ1 of the case shown in FIGS. 2 and 3 (not shown). When the beam shaping element 4 is moved in an opposite direction along the Y-axis, the variation Δ1 of the light emitting point becomes smaller compared with the variation Δ1 of the case shown in FIGS. 2 and 3 (see FIG. 4).

In short, by varying the intervals W1 of the beam shaping element 4 along the non-shaping direction, it is possible to change the variation Δ1 into a desired value by adjusting the position of the beam shaping element 4 in the non-shaping direction. As a result, it is possible to correct the displacement of the light emitting point of individual light sources in accordance with how much the light emitting point of the individual light sources are displaced, without adjusting distance between the beam shaping element 4 and the light source constant.

It is not necessary that the intervals W1 of the sets of diffraction gratings 6 and 7 monotonously change (monotonously increase or monotonously decrease), provided that that the intervals W1 changes. When the intervals W1 monotonously changes along one direction (the non-shaping direction of the light beam), it is possible to attain a monotonous change in the radiation angle of the beam shaping element as a whole. In other words, by moving the position of incidence along the non-shaping direction, the apparent light emitting point seen from the non-shaping direction moves with certain regularity. As a result, it especially preferably becomes easy to correct the displacement between the light emitting point seen from the shaping direction and the apparent light emitting point seen from the non-shaping direction with respect to the light source that radiates the light beam.

In the present embodiment, an arrangement in which the sets of diffraction gratings 6 and 7 of the present embodiment are provided respectively on one of two surfaces is taken as an especially preferable example of the beam shaping element 4. However, it is only necessary that a set of diffraction gratings of the present embodiment is provided at least on one of the two surfaces. When the set of diffraction gratings of the present embodiment is provided only on one of the two surfaces, the other surface may be composed of a cylindrical lens having a column-shaped refraction surface and the same effect as that of a set of diffraction gratings.

When two sets of diffraction gratings of the present invention are provided on both the surfaces of the beam shaping element, one set of diffraction gratings being on one surface and the other set of diffraction gratings being on the reverse surface, it is more preferable that the intervals W1 on one surface and the intervals W1 on the other surface are so arranged as to monotonously increase or monotonously decrease in the same direction along the direction in which each grating-shaped pattern extends [see FIGS. 1(a) to 1(c)]. With such an arrangement of each interval W1 of the two sets of diffraction gratings as described above, it is possible to shape a light beam into a substantially round shape more easily.

Furthermore, it should be noted that the present embodiment describes, as an example, the beam shaping element 4 in which a k-th grating groove (that is the foot of each grating-shaped pattern) counted from a grating-shaped pattern nearest to the Y-axis and a −k-th grating groove are mutually symmetric curves with respect to the Y-axis, where k is an integer number. Thus, the beam shaping element 4 may have an arrangement in which a k-th grating groove counted from a grating-shaped pattern nearest to the Y-axis and a number minus k grating groove are mutually symmetric straight lines with respect to the Y-axis.

[Method for Manufacturing Beam Shaping Element]

Figure 5:
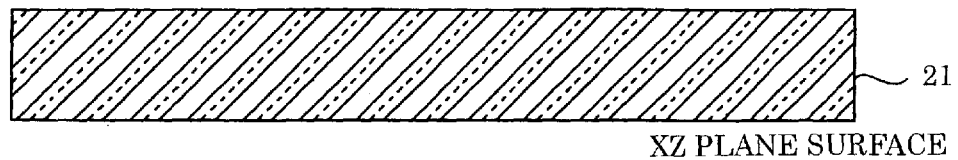
FIGS. 5(a) to 5(c) are side views showing steps of manufacturing multilevel diffraction gratings of the beam shaping element of the present invention by photo etching method.
Figure 5:
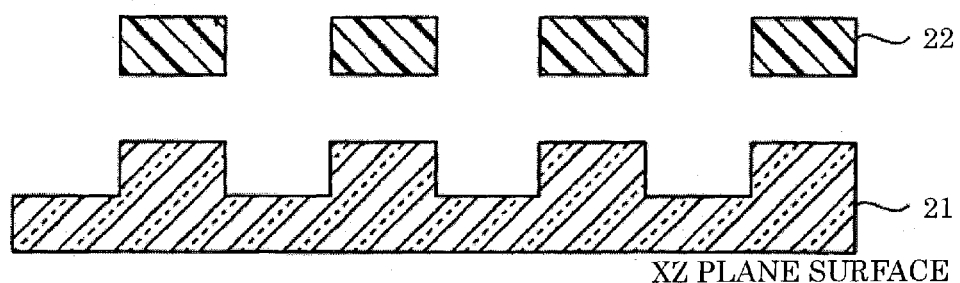
Figure 5:
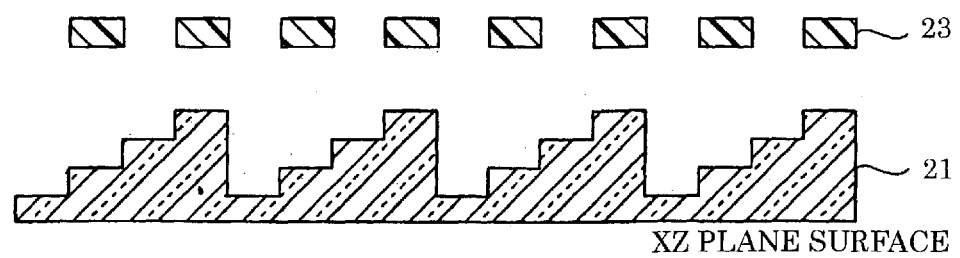

The following describes a method of manufacturing diffraction gratings provided on the beam shaping element 4 of the present embodiment with reference to FIGS. 5(a) to 5(c).

The diffraction gratings 6 and 7 having saw-toothed blaze-like shape provided on the beam shaping element 4 may be arranged as binary-type diffraction gratings having several stages. Such binary-type diffraction gratings having several stages can be prepared by photo etching using multiple masks.

For example, as shown in FIGS. 5(a) to 5(c), photo etching of a substrate 21 made of fused silica is performed by using photo masks (a first mask 22 and a second mask 23) in sequence. The masks are prepared by such methods as ion beam drawing and electronic beam drawing.

In FIG. 5(b), the substrate 21 is partially protected by the first mask 22, is exposed to, for example, ultraviolet radiation directed thereon from right overhead. Because of this, depressed portions are formed on areas that are not protected by the first mask 22.

In FIG. 5(c), the substrate 21 having the depressed portions formed in FIG. 5(b) is partially protected by the second mask 23, and a similar etching is performed. Thus, multilevel diffraction gratings having four stages are obtained by using the first mask 22 and the second mask 23.

In the present embodiment, by using such method for manufacturing the diffraction gratings, the diffraction gratings are so designed as to maximize first order diffraction efficiency. Those areas having wide interval W1 are arranged in a eight-stage stair-like shape for better diffraction efficiency, while those areas having narrow interval W1 are arranged in a four-stage stair-like shape on grounds of manufacturability. The number of stages is not limited to the above-listed numbers; four, eight or 16 stages may be used in accordance with how wide or narrow the intervals W1 is and how much manufacturing accuracy is needed.

Although the photo etching method is used in the present embodiment as the method for manufacturing the diffraction gratings, the means for manufacturing the diffraction gratings is not limited to photo etching method. It is possible, for example, to use such methods as injection molding by a plastic mold and a photopolymer method, and the like.

In injection molding by a plastic mold, for example, melted plastic is poured into a mold for forming a shape of an element and hardened by lowing temperature. This method is highly productive because once a mold is prepared a number of elements can be produced by using the mold.

The mold may have a multilevel shape formed by photolithography or may be mechanically formed by using a turning tool. In this case, it is possible to produce the diffraction gratings having better diffraction efficiency because the diffraction gratings are so formed as to have saw-toothed blaze-like shape.

It is also possible to produce the diffraction gratings having the blaze-like shape by a so-called photo-polymer method including the steps of etching the substrate 21 to form the blaze-like shape, transcribing the blaze-like shape onto a metal stamper, inscribing the shape on an ultraviolet radiation cured resin by using the stamper, and performing ultraviolet curing of the resin.

Both the blaze-type diffraction gratings and the multi-level-type diffraction gratings can be manufactured by etching by performing fine pattern exposure of a photoresist by using an electronic beam.

[Light Source Unit]

As a specific example of the positional adjustment method for the light source and the beam shaping element 4, the following describes steps of manufacturing a semiconductor laser unit (a light source unit: see FIG. 6) 2 by unitizing the light source and the beam shaping element 4 with reference to FIGS. 1 to 4 and FIG. 6.

The semiconductor laser unit 2 includes a semiconductor laser 3 and a beam shaping element 4 fixed on a surface of outgoing radiation of the semiconductor laser 3. The semiconductor laser 3 includes a semiconductor laser element 31 for radiating a light beam 11 having an elliptical shape cross-section, a package 5 in which the semiconductor laser element 31 is contained, an electrode 32 for the semiconductor laser element 31, and a stem 33 on which the semiconductor laser element 31 is mounted.

In manufacturing the semiconductor laser unit 2, it is necessary to decide positions of the beam shaping element 4 and the semiconductor laser element 31. In doing so, it is possible to easily perform all desired adjustment operations by moving the beam shaping element 4 in both vertical and horizontal directions along a reference surface (an upper surface of the package 5).

First, in order to make intensity distribution of the light beam 11 substantially even, an optical axis of the light beam 11 from the semiconductor laser element 31 is positioned on the Y-axis of the beam shaping element 4 so that the light beam 11 and the diffraction gratings 6 and 7 become axial symmetrical (an optical axis positioning step: see FIG. 1(c)).

In the step, it is only necessary to move the beam shaping element 4 in the X-axis direction (the shaping direction). Secondly, in order to perform positional adjustment along the optical axis direction, in other words, to correct the displacement of the light emitting point of the light source, it is only necessary to move the beam shaping element 4 in the Y-axis direction (the non-shaping direction) because astigmatism of the beam shaping element 4 monotonously changes. The semiconductor laser unit 2 is manufactured by fixing on the package 5 the beam shaping element 4 positioned by the step above.

As described above, the positional adjustment of the beam shaping element 4 needs to be performed only in the direction of the plane vertical to the optical axis, that is the X-Y plane surface. In short, it is possible to adjust the displacement of the light emitting point of the light source and the like within the X-Y plain surface, without requiring positional adjustment along the optical axis (the Z-axis), which is required in a conventional beam shaping element. Thus, it is possible to shorten time for adjusting the position of the beam shaping element. It is also possible to save costs because a spacer for adjusting distance between the semiconductor laser element 31 and the beam shaping element 4 is no longer necessary, for example. Especially, reliability is further improved because it is not necessary to have, between the package 5 and the beam shaping element 4, a thick layer of adhesive agent often used as the spacer, which expands or contracts over time, thereby causing a reliability problem.

By using the positional adjustment method above, for example, it is possible to correct displacement of the apparent light emitting point caused by any factor, such as amount of displacement of the actual light emitting element of the light source and displacement of a central wavelength of a radiated light beam. More specifically, when each semiconductor laser element 31 has a different central wavelength of the light beam 11, that is, has inter-individual errors, the radiation angle changes because reflective index of the beam shaping element 4 depends on a wavelength.

This changes the variation $\Delta l$, which is the variation of the apparent light emitting point 9 after the shaping in relation to the actual light emitting point 8 in the shaping direction. However, it is possible to perform similar correction by moving, as mentioned above, the beam shaping element 4 in the non-shaping direction (the Y-axis direction), thereby changing the radiation angle (see FIGS. 2 to 4). Furthermore, displacement of the light emitting point due to inter-individual errors in height of the package 5 can be corrected by a similar method.

[Optical Pickup]

Figure 6:
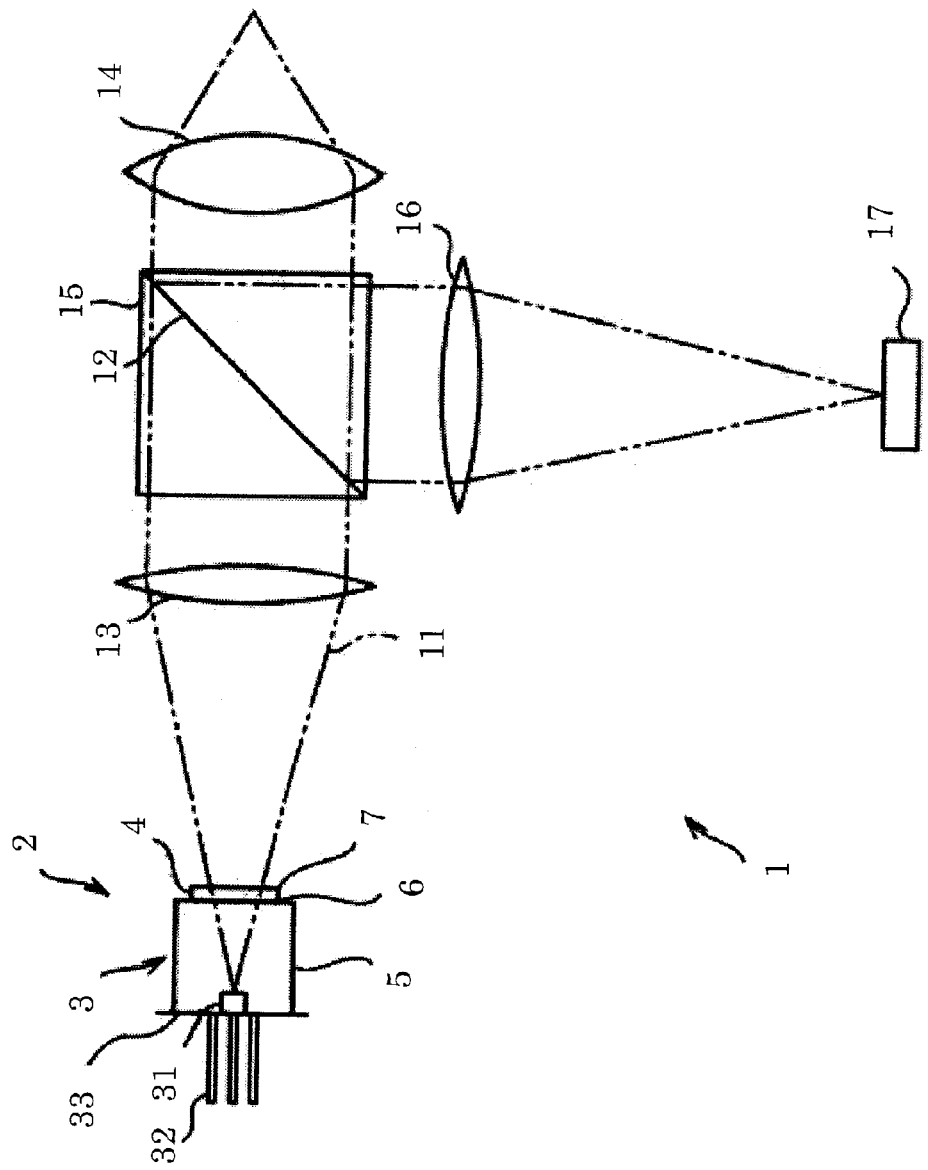
FIG. 6 is a side view showing a schematic arrangement of an optical pickup including the beam shaping element of the present invention.

With reference to FIG. 6, the following describes an optical pickup 1 of the present invention having the semiconductor laser unit 2.

The optical pickup 1 includes the semiconductor laser unit 2, a collimator lens (a parallelization means) 13, a beam splitter 15, and an object glass (a light condensing means) 14 arranged in this order so as to be located on the optical axis of a light beam 11. The optical pickup 1 further includes a condensing lens 16 for condensing a returning light beam (a reflected light), and a detector 17 as a means for receiving a signal from a recording medium (not shown). The returning light beam, an optical path of which is curved by 90 degrees by the beam splitter 15, is condensed by the condensing lens 16 and directed into the detector 17.

The beam shaping element 4 is provided within an area through which the light beam 11 radiated from the semiconductor laser element 31 passes. The area is on the package (a semiconductor laser package) 5. The light beam 11, which is a reproducing light or a recording light, is shaped by the collimator lens 13 from a divergent light into a substantially collimated light, and condensed by the object glass 14 on, for example, a signal recording surface of a recording medium such as an optical disk (not shown). As described above, the light beam 11 having an elliptical shape cross-section is shaped into a substantially round shape by using the beam shaping element 4, so as to attain a very small spot of the light beam 11 on the signal-recording surface, thereby attaining recording and reproducing in high density.

The light beam 11 radiated on the recording medium is reflected by the signal-recording surface, becomes a returning light beam, and is radiated into the object glass 14. The returning light beam from the recording medium becomes a collimated light by passing through the object glass 14. Then, an optical path of the returning light beam is curved by 90 degrees by a polarizing film 12 of the beam splitter 15. The returning light beam from the recording medium, an optical path of which is curved by 90 degrees by the polarizing film 12 of the beam splitter 15, is focused onto the detector 17 by the condensing lens 16. The beam splitter 15 is an optical element having a function of letting in the light beam 11 radiated by the semiconductor laser 3 and curving the optical path of the returning light beam by 90 degrees. The light beam 11 and the returning light beam are separated by the beam splitter 15.

As described above, when the pre-adjusted semiconductor laser unit 2 is used for the optical pickup 1, it is possible to assemble the optical pickup 1 simply by aligning other optical sections such as the collimator lens 13 with the optical axis, thereby significantly simplifying assembly steps.

Even in a case in which the beam shaping element 4 and the semiconductor laser 3, which are not unitized, are used for the optical pickup 1, the displacement of the light emitting point can be corrected by the positional adjustment method of the present invention without changing the distance between the beam shaping element 4 and the semiconductor laser element 31.

As described above, the beam shaping element of the present invention includes a set of diffraction gratings in such a manner that intervals between the gratings farer from a vicinity of an optical axis and nearer to a periphery are narrower, wherein each interval between the respective gratings changes along a direction in which each grating-shaped pattern extends.

According to the arrangement above, because each interval changes along one direction (the non-shaping direction of the light beam), different areas in each grating-shaped pattern radiate an incident light beam in a different radiation angle. Because of this, by moving a position of incidence of the light beam along the non-shaping direction, an apparent light emitting point in the shaping direction moves. This corrects displacement between the light emitting point seen from the shaping direction and the apparent light emitting point seen from the non-shaping direction with respect to the light source that radiates the light beam. In other words, by simply performing positional adjustment in the plane vertical to the optical axis, it is possible to correct the displacement of the light emitting point of the light source, thereby providing a beam shaping element 4 in which a positional adjustment along the optical axis (an adjustment as to distance between the light source and the beam shaping element) is no longer necessary.

Needless to say, because the diffraction gratings are formed in a plurality of grating-shaped patterns, it is possible to align the optical axis of the light source and the beam shaping element in a similar manner to the conventional beam shaping element by simply performing positional adjustment in the plane vertical to the optical axis.

It is more preferable that, in the arrangement above, the intervals of the beam shaping element of the present invention are so arranged as to monotonously increase or monotonously decrease along the direction in which each grating-shaped pattern extends.

According to the arrangement above, in which the intervals monotonously change along one direction (the non-shaping direction of the light beam), the apparent light emitting point seen from the non-shaping direction is moved with certain regularity by moving the position of incidence along the non-shaping direction. As a result, it becomes easy to correct the displacement between the light emitting point seen from the shaping direction and the apparent light emitting point seen from the non-shaping direction with respect to the light source that radiates the light beam.

In the beam shaping element of the present invention having the arrangement above, it is more preferable that the set of diffraction gratings formed in a plurality of grating-shaped patterns is arranged in axial symmetry, and that a shape of a foot (a grating groove) of a k-th grating-shaped pattern counted from a grating-shaped pattern nearest to a Y-axis is described by the following Equation:

[Equation 1] \hfill (1)

$$f(x, y, k) = \sum_{n=0}^{N} \sum_{m=0}^{M} a_{nm} x^{2n} y^m - b|k| = 0$$

where the set of diffraction gratings is a coordinate plane; the Y-axis is an axis of symmetry of the plurality of grating-shaped patterns; the X-axis is an axis that is orthogonal to the Y-axis on the coordinate plane; $a_{00}=0$; $a_{nm}$ is constant; b is a wavelength of a light beam entering the diffraction gratings (nm); $k=\pm 1, \pm 2, \pm 3, \ldots$; both N and M are positive integer numbers; $a_{nm}$, N, and M are values of aberration that does not exceed 0.02 λrms.

Moreover, it is more preferable that blaze profile in depth of the grating-shaped patterns of the set of diffraction gratings is so arranged as to give an incident light an optical path difference described by the following Equation:

[Equation 2]

$$g(x,y,k) = a_{nm} x^{2n} y^m - b|k| \hfill (2)$$

where $a_{nm}$ is constant; N and M are positive integer numbers; $a_{nm}$, N, and M are values of aberration that does not exceed 0.02 λrms. By doing so, the first order diffraction efficiency of the set of diffraction gratings is maximized. If it is difficult to arrange the shape of the groove depth of the grating-shaped patterns of the set of diffraction gratings so as to give the incident light the optical path difference indicated by above Equation (2), the shape of the groove depth of the grating-shaped patterns of the set of diffraction gratings may be so arranged as to give approximately the same optical path difference with the above optical path difference, although the diffraction efficiency is lowered.

According to the arrangement above, it is possible to provide a beam shaping element whose value of aberration is too small to affect the optical pickup as a whole.

It is more preferable that, in the arrangement above, the beam shaping element of the present invention further includes another set of diffraction gratings on a reverse side thereof, on which the set of diffraction gratings is not provided, one of the two sets of diffraction gratings expanding a light beam entering thereto and radiating the light beam thus expanded, and the other of the two sets of diffraction gratings reducing the light beam entering thereto and radiating the incident light beam thus reduced.

According to the arrangement above, after the radiation angles of the light beam are expanded and reduced, the shaped light beam is radiated. This prevents an expansion of the displacement between the light emitting point seen from the shaping direction and the light emitting point seen from the non-shaping direction, thereby minimizing amount of positional adjustment of the beam shaping element in the plane vertical to the optical axis.

It is more preferable that, in the arrangement above, the beam shaping element of the present invention further includes a cylindrical lens on a reverse side thereof, on which the set of diffraction gratings is not provided, one of the set of diffraction gratings and the cylindrical lens expanding a light beam entering thereto and radiating the light beam thus expanded, and the other of the set of diffraction gratings and the cylindrical lens reducing the light beam entering thereto and radiating the light beam thus reduced.

According to the arrangement above, in which the set of diffraction gratings is provided only on one of two surfaces of the beam shaping element, by arranging the surface without the diffraction gratings as to have the same characteristic with that of the diffraction gratings, it is possible to correct astigmatic difference and to make intensity distribution of the light even in horizontal and vertical directions.

It is more preferable that, in the arrangement above, the diffraction gratings of the beam shaping element of the present invention has, in a direction in which the grating-shaped pattern extends and in a direction being vertical thereto, the astigmatism corresponding to the amount of displacement of the light emitting point of the light source, and that the astigmatism changes along the direction in which the grating-shaped pattern extends within a range that includes at least the inter-individual errors in the amount of displacement of the light emitting point of the light source.

According to the arrangement above, it is possible to realize such a correction as to completely cancel out the displacement of the light emitting point because the diffraction gratings have, between the non-shaping direction and the shaping direction, the astigmatism that enable the correction of the amount of displacement. In addition, it is possible to realize such a correction as to completely cancel out the displacement of the light emitting point caused by inter-individual unevenness in each light source manufactured because the astigmatism changes along the direction in which each grating-shaped pattern extends so as to enable the correction of inter-individual errors in the amount of displacement of the light emitting element (difference of the amount of displacement of the light emitting points among a plurality of light sources manufactured under the same specification).

As described above, the positional adjustment method of the present invention for the beam shaping element described in one of the arrangements above and the light source that radiates the light beam into the beam shaping element includes the step of moving the light source relatively along a direction towards inside a surface of the beam shaping element while keeping constant distance between the beam shaping element and the light source, so as to correct displacement of a light emitting point.

According to the method above, it is possible to provide such a positional adjustment method as to enable the correction of the displacement of the light source simply by adjusting at least one of positions of the light source and the beam shaping element within the surface, thereby making it unnecessary to adjust the distance between the light source and the beam shaping element.

The positional adjustment method is, for example, adopted in a case in which the beam shaping element and the light source (a semiconductor laser and the like) are unitized. Adoption of the positional adjustment method makes it easy to assemble (unitize) the beam shaping element and the light source because the inter-individual errors in each light source can be dealt with without individually adjusting height of the package (a section for containing the light source), on which the distance between the light source and the beam shaping element depends. Furthermore, it is not necessary to provide, between the package and the beam shaping element, a layer of adhesive agent, which expands or contracts over time, thereby causing a reliability problem.

Furthermore, the positional adjustment method above may be adopted, for example, for adjusting at least one of the positions of the light source and the beam shaping element in the optical pickup. When the positional adjustment method above is adopted, it is no longer necessary to separately provide a jig for moving the beam shaping element or the light source along the optical axis direction so as to correct the displacement of the light source.

As described above, the optical source unit of the present invention includes the beam shaping element described in one of the arrangements above and the light source for radiating the light beam into the beam shaping element, at least one of positions of the beam shaping element and the light source being adjusted by the positional adjustment method.

According to the arrangement above, it is possible to provide the optical source unit that is easy to assemble and highly reliable.

As described above, the optical pickup of the present invention includes a light source for radiating a light beam in an elliptical shape, a beam shaping element described in one of the arrangements above for shaping the light beam received from the light source into a substantially round shape, a collimating means for parallelizing the light beam shaped into the substantially round shape by the beam shaping element, and a condensing means for condensing the light beam parallelized by the collimating means.

According to the arrangement above, it is possible to provide such an optical pickup that is capable of condensing, by using the condensing means, the light beam radiated from the light source into a spot having the substantially round shape, and that does not require the jig (the moving mechanism) for moving the beam shaping element or the light source along the optical axis direction in order to correct the displacement of the light source. In addition, the beam shaping element may be one component of the optical source unit coupled with the light source.

The beam shaping element of the present embodiment having diffraction gratings on one of two surfaces of a plate-type element transparent at least at a wavelength of a light beam radiated from a light source used, wherein each interval between respective gratings on at least one of the two surfaces monotonously increases or monotonously decreases along a direction in which each grating-shaped pattern extends.

Furthermore, the beam shaping element of the present embodiment having the arrangement above may be so arranged that a k-th grating groove counted from a grating groove nearest to the Y-axis satisfies the following Equation, which fulfills the following conditions concerning NA of the collimator lens:

[Equation 3] (1)
$$f(x, y, k) = \sum_{n=0}^{N} \sum_{m=0}^{M} a_{nm} x^{2n} y^m - b|k| = 0$$

where the origin is a center of the beam shaping element; the X-axis is the shaping direction; the Y-axis is the non-shaping direction; $a_{00}=0$; $a_{nm}$ is constant; $k=\pm 1, \pm 2, \pm 3, \ldots$; N and M are positive integer numbers.

If NA=0.1
   surface of incidence: $N\geq 1, M\geq 1$
   surface of outgoing radiation: $N\geq 1, M\geq 1$
or
   surface of incidence: $N\geq 2, M\geq 1$
   surface of outgoing radiation: $N\geq 1, M\geq 0$ If $0.1<NA\geq 0.11$
   surface of incidence: $N\geq 1, M\geq 5$
   surface of outgoing radiation: $N\geq 1, M\geq 4$
or
   surface of incidence: $N\geq 1, M\geq 1$
   surface of outgoing radiation: $N\geq 2, M\geq 1$
or
   surface of incidence: $N\geq 2, M\geq 2$
   surface of outgoing radiation: $N\geq 1, M\geq 0$ If $0.11<NA\leq 0.12$
   surface of incidence: $N\geq 1, M\geq 1$
   surface of outgoing radiation: $N\geq 2, M\geq 1$
or
   surface of incidence: $N\geq 2, M\geq 2$
   surface of outgoing radiation: $N\geq 1, M\geq 0$ If $0.12<NA\leq 0.17$
   surface of incidence: $N\geq 2, M\geq 1$
   surface of outgoing radiation: $N\geq 2, M\geq 2$
or
   surface of incidence: $N\geq 2, M\geq 2$
   surface of outgoing radiation: $N\geq 2, M\geq 1$ If $0.17<NA\leq 0.2$
   surface of incidence: $N\geq 2, M\geq 2$
   surface of outgoing radiation: $N\geq 2, M\geq 1$ Moreover, the beam shaping element of the present embodiment having the arrangement above may be so arranged that one of the two sets of diffraction gratings has positive power (radiation angle), and the other set of the diffraction gratings has negative power.

Furthermore, the beam shaping element of the present embodiment having the arrangement above may be so arranged as to have, in advance, astigmatism corresponding to astigmatic difference of a semiconductor laser light source in the direction of gratings and in the direction vertical thereto, the astigmatism changing in the non-shaping direction at least within the range including the inter-individual errors in each laser light source.

Moreover, the semiconductor laser unit of the present embodiment including the semiconductor laser element for radiating the elliptical shape beam, the stem on which the semiconductor laser element is mounted, and the beam shaping element for shaping the elliptical shape beam into the substantially round shape may be so arranged that the beam shaping element is the beam shaping element described in one of the beam shaping elements having the arrangement above.

Furthermore, the method for adjusting the semiconductor laser unit of the present embodiment having the arrangement above may be so arranged that the position of the beam shaping element is adjusted in the shaping direction in order to coordinate the optical axis of the semiconductor laser element with the beam shaping element, and that the position of the beam shaping element is adjusted in the non-shaping direction in order to reduce effect of the astigmatic difference of the semiconductor laser.

Moreover, the optical pickup of the present embodiment including the semiconductor laser element for radiating the elliptical shape beam, the stem on which the semiconductor laser element is mounted, the beam shaping element for shaping the elliptical shape beam into the substantially round shape, the collimator lens, and the object glass may be so arranged that the beam shaping element is the beam shaping element described in one of the beam shaping elements having the arrangement above.

EXAMPLES

The following describes, by explaining examples, specific design examples of the beam shaping element 4 described in the embodiment.

In the optical pickup 1 shown in FIG. 6, the light beam 11 of the semiconductor laser 3 had a central wavelength of 405 nm. The light beam 11 of the semiconductor laser 3 had different radiation angles in horizontal and vertical directions: full angle at half maximum (half of the radiation angle) in the direction horizontal with respect to a composition surface of the semiconductor laser 3 was 10 degrees, and full angle at half maximum (half of the radiation angle) in the direction vertical with respect to the composition surface of the semiconductor laser 3 was 26 degrees, whereby the light beam 11 of the semiconductor laser 3 had a substantially elliptical shape. The light beam 11 was shaped into a substantially round shape by expanding the radiation angle in the shaping direction (the horizontal direction). Then, the light beam was sufficiently focused onto a disk (not shown), thereby utilization efficiency of light volume of the beam was increased.

More specifically, the light beam 11 was shaped from a divergent light into a substantially collimated light by a collimator lens 13 having an NA (numerical aperture) of 0.15, and radiated onto a track of the disk having a cover glass width of 0.1 mm by an object lens 14 having an NA of 0.85.

The beam shaping element 4 had, by using fused silica as a material of the substrate, shaping ratio of 2.2 and distance of 2.3 mm between the surface of incidence (the first set of diffraction gratings 6) and a surface of outgoing radiation (the second set of diffraction grating 7). The shaping ratio here was α2/α1 in FIG. 2. Assuming that coordinate axes were as shown in FIGS. 1(a) to (c), a shape of a foot (a grating groove) of a k-th grating-shaped pattern counted from a grating-shaped pattern nearest to the Y-axis was so designed that, in accordance with a grating-shape function f (x, y, k)=0 (hereinafter the grating-shape function) shown in Equation (1) above, the first set of diffraction grating 6 satisfied:

$$f(x, y, k) = 0.9120 x^2 + 0.1360 x^2 y - 0.0232 x^2 y^2 - \quad (3)$$
$$0.0013 x^2 y^3 + 0.0167 x^2 y^4 - 1.9173 x^4 -$$
$$4.9231 x^4 y + 0.4677 x^4 y^2 + 0.1099 x^4 y^3 -$$
$$0.5589 x^4 y^4 - 0.000405 |k| = 0$$

and the second set of diffraction grating 7 satisfied:

$$f(x, y, k) = 0.07677 x^2 - 0.00295 x^2 y + 0.00059 x^2 y^2 + \quad (4)$$
$$0.00012 x^2 y^3 - 0.00023 x^2 y^4 +$$
$$0.005351 x^4 + 0.007273 x^4 y -$$
$$0.00132 x^4 y^2 - 0.00066 x^4 y^3 +$$
$$0.000301 x^4 y^4 - 0.000405 |k| = 0$$

From this, it is possible to determine an interval W1 at a certain value y. Table 1 shows specific intervals W1.

TABLE 1

Design Examples of the Beam shaping Element

| | Value of Y-Coordinate (mm) | Most Internal Interval (μm) | Most External Interval (μm) |
|---|---|---|---|
| Surface of Incidence | −1 | 22.9 | 1.92 |
| | 0 | 21.1 | 2.00 |
| | 1 | 19.8 | 2.06 |
| Surface of Outgoing Radiation | −1 | 74.2 | 4.47 |
| | 0 | 72.6 | 4.63 |
| | 1 | 71.5 | 4.74 |

The most internal interval in Table 1 is distance between the Y-axis and a grating groove closest to the Y-axis; the most external interval is the distance between a grating groove of an outmost grating and a grating groove of a grating next to the outmost grating. For example, when it is assumed that the outmost grating is p-th (p is an integer number), the most external interval refers to distance between a grating groove of (p−1)th grating and a grating groove of the p-th grating (a grating groove of number −(p−1) grating and a grating groove of number −p grating).

It was more preferable that blaze profile in depth of the grating-shaped patterns of the set of diffraction gratings was so arranged as to give an incident light an optical path difference indicated by the following Equation:

[Equation 4]

$$g(x,y,k) = a_{nm} x^{2n} y^m - b|k| \quad (2)$$

where $a_{nm}$ is constant; N and M are positive integer numbers; $a_{nm}$, N, and M are values of aberration that do not exceed 0.02 λrms. By doing so, the first order diffraction efficiency of the set of diffraction gratings is maximized. If it is difficult to arrange the shape of the groove depth of the grating-shaped patterns of the set of diffraction gratings so as to give the incident light the optical path difference indicated by above Equation (2), the shape of the groove depth of the grating-shaped patterns of the set of diffraction gratings may be so arranged as to give approximately the same optical path difference as the above optical path difference, although the diffraction efficiency is lowered.

The beam shaping element 4 increased the radiation angle of the light beam 11 by using the first set of diffraction gratings 6 on the surface of incidence and decreased the radiation angle of the light beam 11 by using the second set of diffraction gratings 7 on the surface of outgoing radiation. Assuming that the shaping direction is the Y-axis direction, the beam shaping element 4 may decrease the radiation angle of the light beam 11 on the surface of incidence and increase the radiation angle of the light beam 11 on the surface of outgoing radiation.

Here, when the beam shaping element was put in a divergent pencil of light, aberration occurred in accordance with the variation of the intervals W1 because the intervals W1 of the beam shaping element 4 was changed in the non-shaping direction. The aberration needs to be sufficiently small.

When the variation is too small, on the other hand, moving distance of the beam shaping element becomes long in order to correct displacement of the apparent light emitting point due to the inter-individual errors in the central wavelength, the displacement of the actual light emitting point of the semiconductor laser 3, and height in each package 5 produced. Moreover, because the beam shaping element 4 as a whole becomes large, sufficiently small beam shaping element 4 cannot be obtained. Therefore, degree of dependence of the variation of the intervals W1 on value y (the grating-shape function) is so decided that the moving distance of the beam shaping element 4 is shortened and the aberration is optimized so as to attain sufficiently small aberration.

The grating-shape function was decided as follows: a value of a modulus $a_{nm}$ was optimized by using a simulation software [product name: "CodeV" (manufactured by Optical Research Associates)] so that a value of the aberration of the optical pickup as a whole was minimized, while assuming the NA, N and M in the Equation (1) with appropriate values and keeping the shaping ratio constant. The values of N and M of the Equation (1) are under no particular restriction. The NA and the shaping ratio were decided in accordance with optical design of the pickup as a whole. When an optimized value of the aberration was equal to or less than 0.02 λrms, it was judged that the modulus $a_{nm}$ was usable; when an optimized value of the aberration was more than 0.02 λrms, it was judged that the modulus $a_{nm}$ is unusable.

Figure 7:
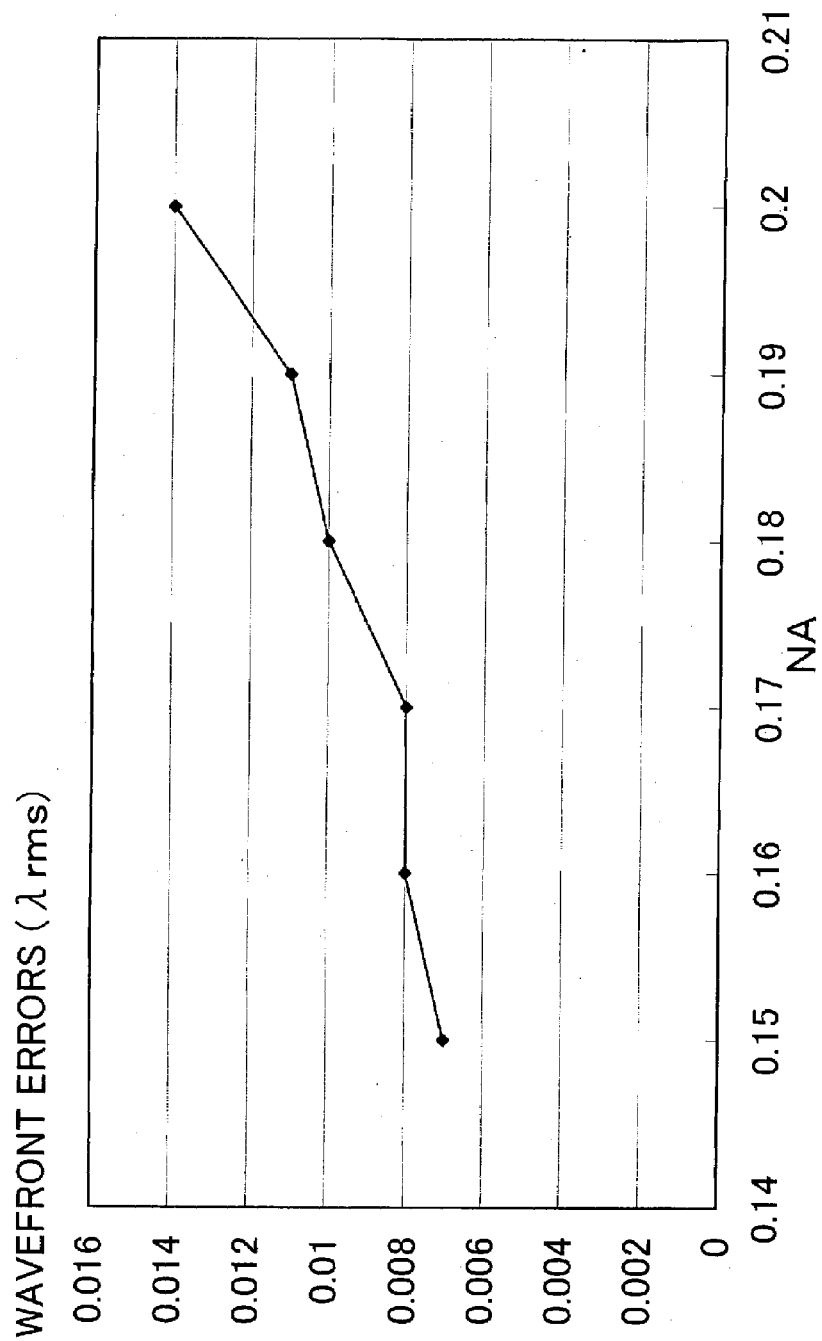
FIG. 7 is a graph showing relationship between an NA (numerical aperture) of a collimator lens and aberration (wavefront errors), concerning the beam shaping element of the present invention.

The following more generally describes how to decide the specific grating-shape function for the diffraction gratings provided to the beam shaping element. First, concerning the relationship between the NA of the collimator lens 13 and the astigmatism (hereinafter aberration) of the beam shaping element 4 described in λrms, as shown in FIG. 7, the aberration increased as the NA increased. Although the collimator lens having the NA of 0.15 was used in the present example, the collimator lens was designed as to have an NA of 0.2 in order to allow errors such as position displacement to occur. (The value of the NA actually used is referred to as a design value hereinafter.)

Figure 8:
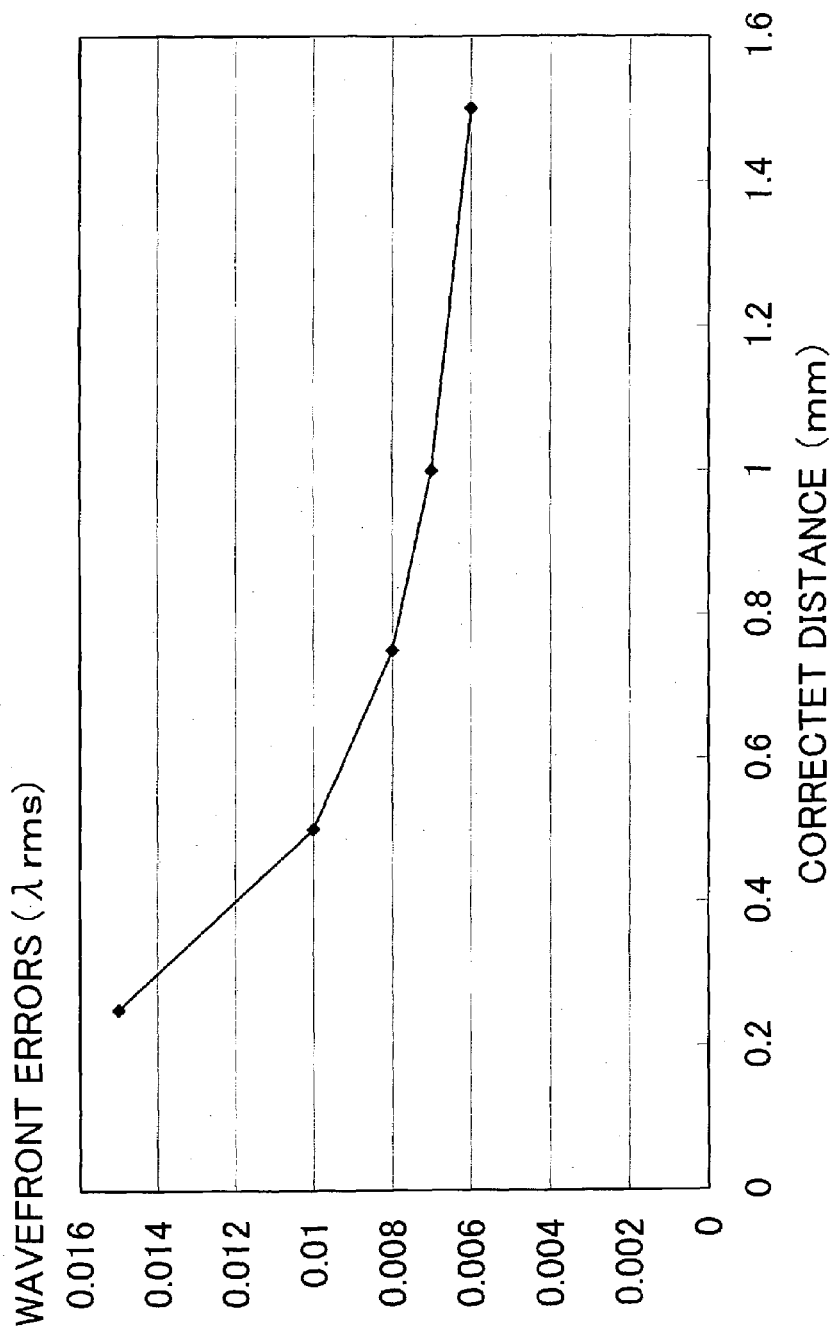
FIG. 8 is a graph showing relationship between corrected distance of the beam shaping element of the present invention and aberration (wavefront errors).

Furthermore, regarding the relationship between corrected distance and the aberration, as shown in FIG. 8, when movable distance of the beam shaping element 4 along the Y-axis was extended, the aberration became small because the variation of the intervals W1 per unit distance could be kept relatively small. However, the beam shaping element 4 as a whole becomes large. The corrected distance needs to be about 1 mm or less because a size of the package 5 is normally about 5 mm.

Thus, the grating-shape function was so decided that inter-individual errors of ±50 μm in the height of each package 5 for the semiconductor laser 3 could be corrected by moving the beam shaping element 4 by about 1 mm or less along the Y-axis direction. In other words, the grating-shape function was so decided that the radiation angle was changed in response to inter-individual error of +50 μm in the height of the package 5 in a position to which the beam shaping element 4 was moved about 1 mm along the Y-axis direction and that the radiation angle was changed in response to inter-individual error of −50 μm in the height of the package 5 in a position to which the beam shaping element 4 was moved about −1 mm along the Y-axis direction.

Although the inter-individual errors in the height of each package 5 depends on a manufacturing method thereof and materials thereof, the inter-individual errors fall within the range of ±50 μm in a generally available high-precision package. In each case, the variation of the intervals W1 per unit distance depends on the error in the height of the package 5 and on the corrected distance. Here, because an upper limit allowed to the aberration to occur in a single optical element was about 0.02 λrms considering that aberration occurred in each optical element of the pickup, the modulus $a_{nm}$, N, and M of the conditions of the following grating-shape function was so decided that the aberration occurring in the beam shaping element 4 became equal to or less than 0.02 λrms in any position of y:

[Equation 5]

$$f(x, y, k) = \sum_{n=0}^{N} \sum_{m=0}^{M} a_{nm} x^{2n} y^m - b|k| = 0 \quad (1)$$

where $a_{00}=0$; $a_{nm}$ and b are constant; $k=\pm1, \pm2, \pm3, \ldots$; N and M are positive integer numbers. In order to make the diffraction grooves axisymmetrical with each other with respect to the Y-axis, x is designed to be an even function. Moreover, b is the wavelength of the light beam radiated into the diffraction gratings.

The following Table 2 shows combinations of N and M by which the aberration at a value of 0.15 of the actually used collimator lens 13 satisfied the above conditions concerning a case in which, as described above, a design value of the NA of the collimator lens 13 was designed to be 0.2, and a corrected distance was designed to be 1 mm. The following Tables 3 to 7 show combinations of N and M by which the aberration satisfied the above conditions concerning a case in which an implemented value of the NA of the collimator lens 13 was changed by 0.01 gradually from 0.1 to 0.2, and a corrected distance was designed to be 1 mm.

In the following Tables, ○ indicates that the combination satisfied the condition of aberration being equal to or less than 0.02 λrms; X indicates that the combination did not satisfy the condition of aberration being equal to or less than 0.02 λrms. As explicitly shown in Tables 2 to 7, it was found that there are cases in which first order dependency on y is maintained on any condition [M=1 in Equation (1)]. In other words, it was found that there are cases in which the condition on aberration is satisfied even by using the diffraction gratings that have a linear shape and are simply inclined.

Furthermore, concerning a case in which only the diffraction gratings on one of the two surfaces had the dependency on y (M=0 on one side), when an implemented value of the NA was equal to or more than 0.13, the condition on aberration was not satisfied as shown in the following Tables 2, 6, and 7. On the other hand, when a value of the NA actually used was equal to or less than 0.12, the condition on aberration was satisfied as shown in the following Tables 3 to 5.

Furthermore, a beam shaping element a surface of incidence of which was not dependent on y (M=0 on the surface of incidence) did not satisfy the condition on aberration in the design examples as shown in the following Tables 2 to 7. However, the same effect could be achieved when the astigmatism of the beam shaping element monotonously changed along the Y-axis direction. Therefore, in a design example in which the NA was smaller, for example, the condition on aberration being equal to or less than 0.02 λrms was satisfied even when M=0 on the surface of incidence.

Optimization could be more easily achieved when the NA is smaller because the variation of the intervals W1 was small in the light beam hitting the beam shaping element, thereby preventing coma aberration from occurring. In other words, within a range where the light beam was radiated, the aberration of 0.02 λrms or more occurred when inclination of a curve of the grating-shaped pattern reached certain level. Therefore, the higher orders of X and Y were, and the more parameter modulus $a_{nm}$, the easier it became to prevent the inclination of the curve of the grating-shaped pattern from increasing locally, thereby to achieve the optimization.

TABLE 2

Combinations of N and M that satisfied the condition on aberration of the collimator lens, when the value of the NA actually used is 0.15 (a value on the surface of incidence - a value on the surface of outgoing radiation)

| | M | | | | | | |
|---|---|---|---|---|---|---|---|
| N | 0-1 | 0-7 | 1-0 | 7-0 | 1-1 | 1-2 | 2-1 |
| 1-1 | X | X | X | X | X | X | X |
| 1-2 | X | X | X | X | X | X | X |
| 2-1 | X | X | X | X | X | X | X |
| 2-2 | X | X | X | X | X | ○ | ○ |

TABLE 3

Combinations of N and M that satisfied the condition on aberration of the collimator lens, when the value of the NA actually used is 0.1 (a value on the surface of incidence - a value on the surface of outgoing radiation)

| | M | | | | |
|---|---|---|---|---|---|
| N | 0-1 | 0-7 | 1-0 | 7-0 | 1-1 |
| 1-1 | X | X | X | X | ○ |
| 1-2 | X | X | X | X | ○ |
| 2-1 | X | X | ○ | ○ | ○ |
| 2-2 | X | X | ○ | ○ | ○ |

TABLE 4

Combinations of N and M that satisfied the condition on aberration of the collimator lens, when the value of the NA actually used is 0.11 (a value on the surface of incidence - a value on the surface of outgoing radiation)

| | M | | | | | | |
|---|---|---|---|---|---|---|---|
| N | 0-1 | 0-7 | 2-0 | 7-0 | 1-1 | 4-5 | 5-4 |
| 1-1 | X | X | X | X | X | X | ○ |
| 1-2 | X | X | X | X | ○ | ○ | ○ |
| 2-1 | X | X | ○ | ○ | ○ | ○ | ○ |
| 2-2 | X | X | ○ | ○ | ○ | ○ | ○ |

TABLE 5

Combinations of N and M that satisfied the condition on aberration of the collimator lens, when the value of the NA actually used is 0.12 (a value on the surface of incidence - a value on the surface of outgoing radiation)

| | M | | | | | | |
|---|---|---|---|---|---|---|---|
| N | 0-1 | 0-7 | 1-0 | 2-0 | 7-0 | 1-1 | 7-7 |
| 1-1 | X | X | X | X | X | X | X |
| 1-2 | X | X | X | X | ○ | ○ | ○ |
| 2-1 | X | X | X | ○ | ○ | ○ | ○ |
| 2-2 | X | X | X | ○ | ○ | ○ | ○ |

TABLE 6

Combinations of N and M that satisfied the condition on aberration of the collimator lens, when the value of the NA actually used is 0.13 to 0.17 (a value on the surface of incidence - a value on the surface of outgoing radiation)

| | M | | | | | | |
|---|---|---|---|---|---|---|---|
| N | 0-1 | 0-7 | 1-0 | 7-0 | 1-1 | 1-2 | 2-1 |
| 1-1 | X | X | X | X | X | X | X |
| 1-2 | X | X | X | X | X | X | X |
| 2-1 | X | X | X | X | X | X | X |
| 2-2 | X | X | X | X | X | ○ | ○ |

TABLE 7

Combinations of N and M that satisfied the condition on aberration of the collimator lens, when the value of the NA actually used is 0.18 to 0.2 (a value on the surface of incidence - a value on the surface of outgoing radiation)

| | M | | | | | | |
|---|---|---|---|---|---|---|---|
| N | 0-1 | 0-7 | 1-0 | 7-0 | 1-1 | 1-2 | 2-1 |
| 1-1 | X | X | X | X | X | X | X |
| 1-2 | X | X | X | X | X | X | X |
| 2-1 | X | X | X | X | X | X | X |
| 2-2 | X | X | X | X | X | X | ○ |

Figure 9:
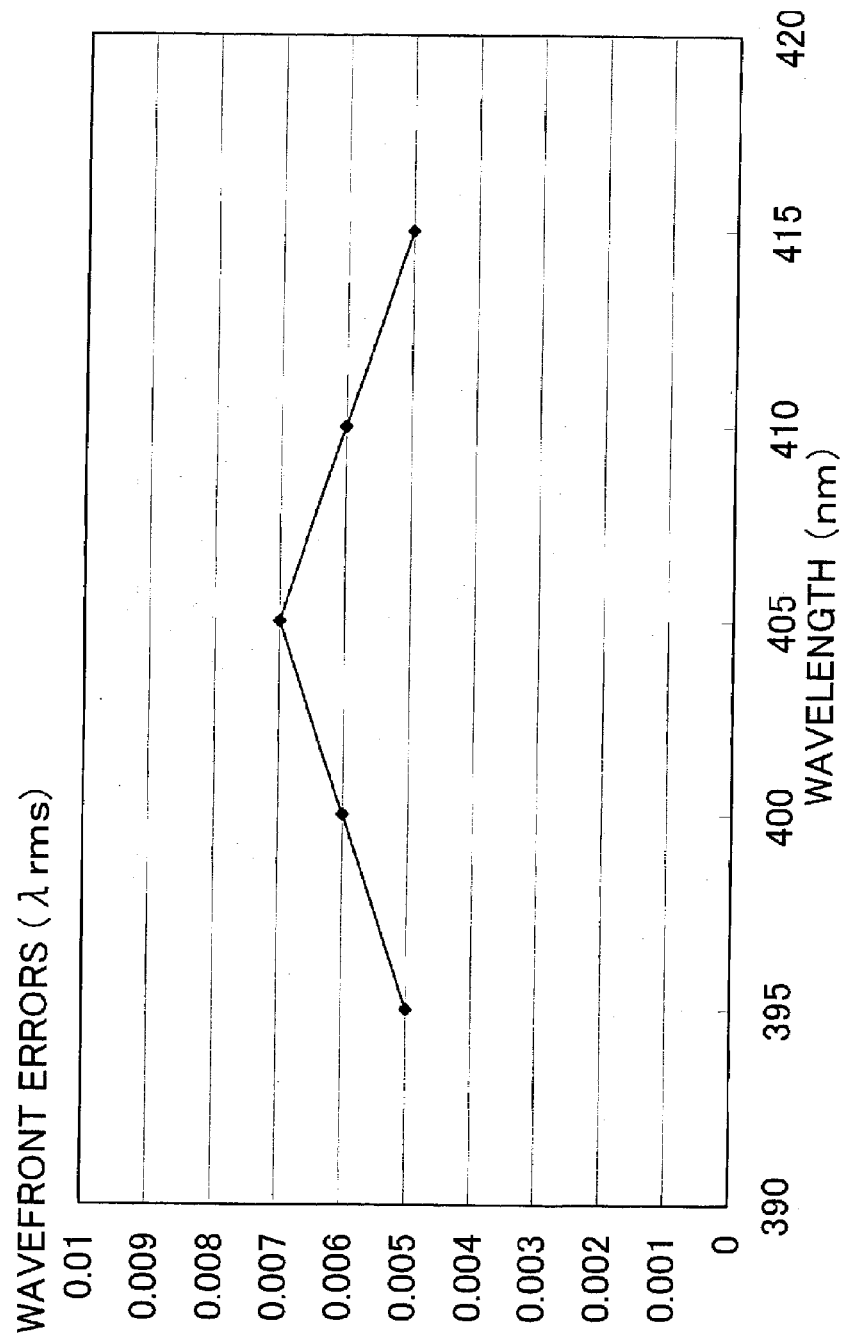
FIG. 9 is a graph showing relationship between inter-individual errors (inter-individual unevenness) in a central wavelength of a semiconductor laser and rms values of aberration (wavefront errors) caused due to the inter-individual errors in the wavelength of the semiconductor laser.

Furthermore, FIG. 9 is an rms value of aberration on the disk when positional adjustment was performed by the method of the embodiment above so that the value of the aberration of the light beam 11 on the disk became small even if there was a change within a range of 405±10 nm, which was actual inter-individual errors in the central wavelength of the light beam 11, concerning a case in which shapes of foots of the grating-shaped patterns in both the first set of diffraction gratings 6 and the second set of diffraction gratings 7 were so decided that N=2 and M=4 in Equation (1).

Figure 10:
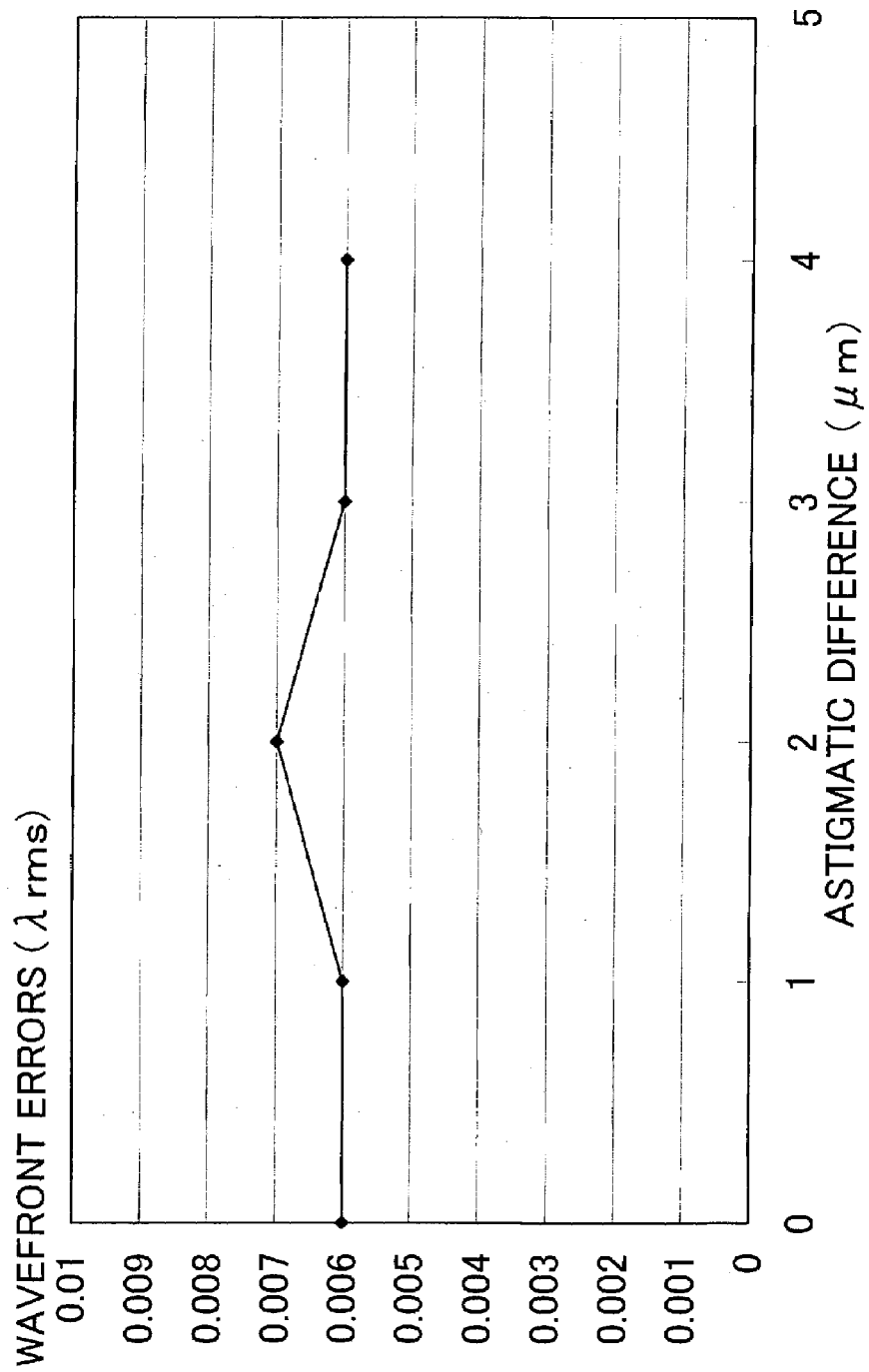
FIG. 10 is a graph showing relationship between inter-individual errors (inter-individual unevenness) in astigmatic difference (displacement of the light emitting point) of the semiconductor laser and rms values of aberration (wavefront errors) caused due to the inter-individual errors in the astigmatic difference of the semiconductor laser.
Figure 11:
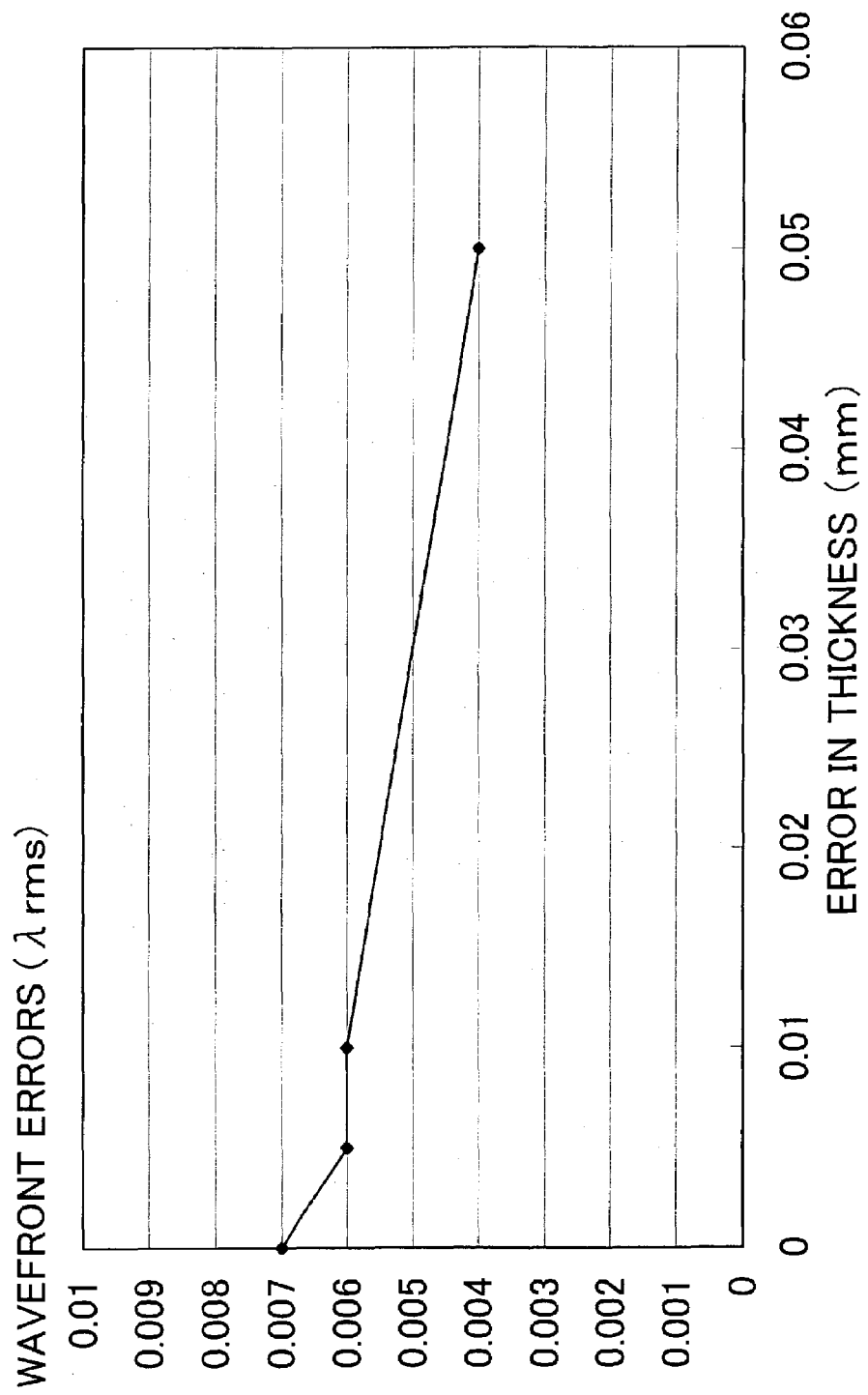
FIG. 11 is a graph showing relationship between inter-individual errors (inter-individual unevenness) in thickness of the beam shaping element of the present invention and rms values of aberration (wavefront errors) caused due to the inter-individual errors in thickness of the beam shaping element.
Figure 12:
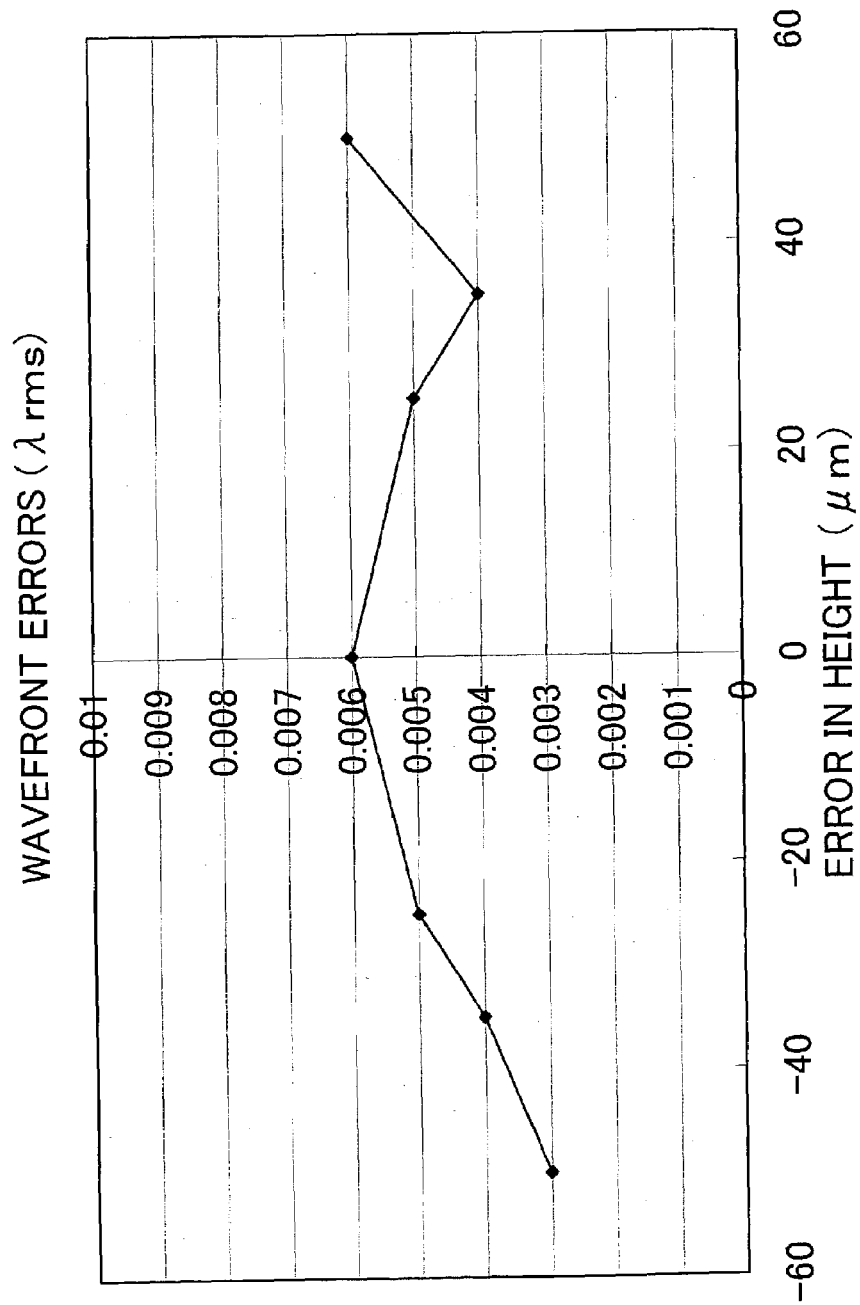
FIG. 12 is a graph showing relationship between inter-individual errors (inter-individual unevenness) in height of a package of the semiconductor laser and rms values of aberration (wavefront errors) caused due to the inter-individual errors in height of the package of the semiconductor laser.
Figure 13:
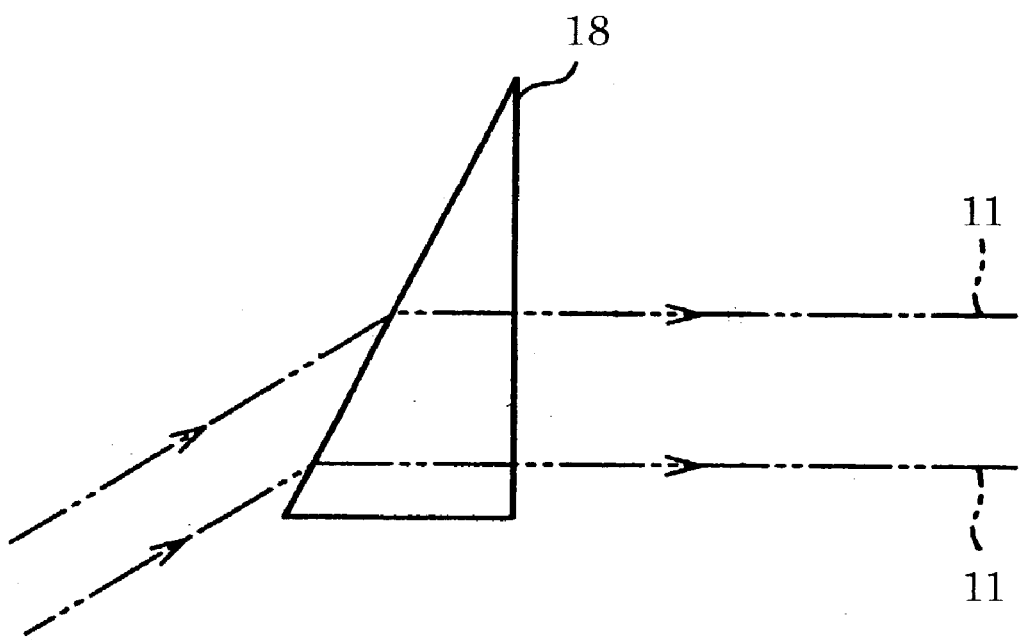
FIG. 13 is a side view showing beam shaping by a shaping prism, which is a conventional beam shaping means.
Figure 14:
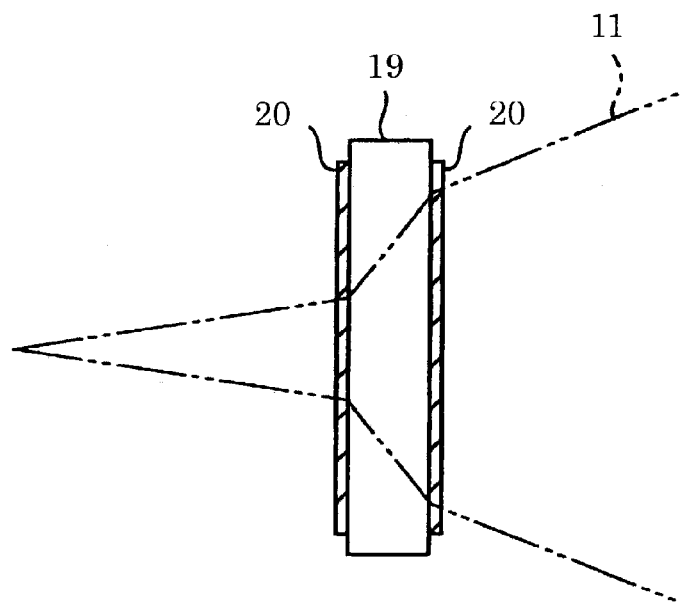
FIG. 14 is a side view showing beam shaping by a conventional shaping element.
Figure 15:
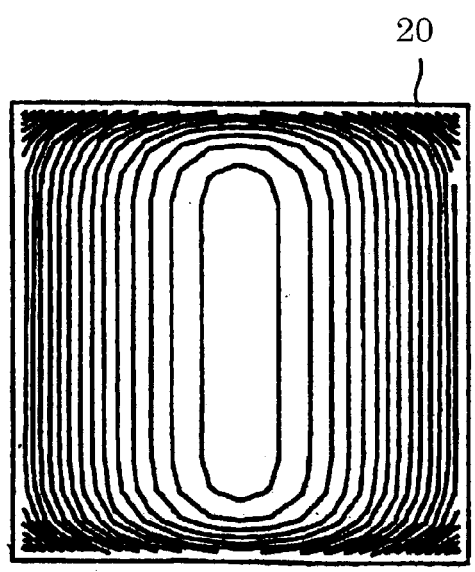
FIG. 15 is a front view showing a hologram of the conventional shaping element.

FIG. 10 is an rms value of aberration on the disk when similar positional adjustment is performed in response to 2±2 μm, which is an inter-individual error in the displacement of the actual light emitting point of the light source (astigmatic difference in the figure). FIG. 11 is an rms value of aberration on the disk when similar positional adjustment was performed in response to 2±0.05 mm±50 μm, which was an error in thickness of the beam shaping element 4. FIG. 12 is an rms value of aberration on the disk when similar positional adjustment was performed in response to a center value of ±50 μm, which was an error in height among each package 5.

From the above results, it was found that inter-individual unevenness in such as the central wavelength, astigmatic difference of the semiconductor laser, and the height of each package, and the variation of the value of rms of the aberration caused by the error in thickness of the beam shaping element itself were minimized. In other words, it was found that the displacement of the apparent light emitting point was so corrected as to be approximately equal irrespective of the inter-individual errors.

Therefore, when (a) the implemented value of the NA of the collimator lens 13 was 0.15, (b) the shaping ratio of the beam shaping element 4 was 2.2, and (c) fused silica is used, as shown in Table 2, the beam shaping element 4 did not become too large and the effect of the aberration occurring in the beam shaping element 4 could be reduced by assuming that N≧=2 and M≧2 in Equation (1) in order to determine the shapes of the grating-shaped patterns in both the first set of diffraction gratings 6 and the second set of diffraction gratings 7.

In the present embodiment, considering that errors might occur, both x and y were designed to be quartic as described above (see above Equations (3) and (4)). By so arranging the intervals W1 of the element as to monotonously change in the non-shaping direction, it was possible to suppress the aberration occurring, thereby providing the beam shaping element capable of correcting the inter-individual unevenness in such as the central wavelength, astigmatic difference of the semiconductor laser, and the height of each package, and the error in thickness of the beam-shaping element itself.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A beam shaping element having, on one surface thereof, a set of diffraction gratings that are spaced from each other in a first direction and that extend in a second direction, the second direction being primarily along one axis that is perpendicular to an optical axis, and wherein:
the first direction is perpendicular to the second direction,
the diffraction gratings are spaced from each other in the first direction in such a manner that intervals between the diffraction gratings farer from a vicinity of the optical axis and nearer to a periphery are narrower, and
each interval between respective diffraction gratings in the first direction also gradually changes along the second direction in which each grating-shaped pattern extends, wherein the grating-shaped patterns are asymmetric with the first direction therebetween.

2. A beam shaping element having, on one surface thereof, a set of diffraction gratings that extend in a direction primarily along one axis that is perpendicular to an optical axis and in such a manner that intervals between the gratings farer from a vicinity of the optical axis and nearer to a periphery are narrower, wherein:
each interval between the respective gratings changes along the direction in which each grating-shaped pattern extends;
the set of diffraction gratings has a plurality of grating-shaped patterns arranged in axial symmetry; and
a shape of a foot of a k-th grating-shaped pattern counted from a grating-shaped pattern nearest to a Y-axis is described by the following Equation:

[Equation 6] (1)

$$f(x, y, k) = \sum_{n=0}^{N} \sum_{m=0}^{M} a_{nm} x^{2n} y^m - b|k| = 0$$

where the set of diffraction gratings is a coordinate plane; the Y-axis is an axis of symmetry of the plurality of grating-shaped patterns; the X-axis is an axis that is orthogonal to the Y-axis on the coordinate plane; $a_{00}=0$; $a_{nm}$ is constant; b is a wavelength of a light beam entering the diffraction gratings; k=1, ±2, ±3, . . . ; both N and M are positive integer numbers; $a_{nm}$, N, and M are values of aberration that does not exceed 0.02 λrms.

3. A beam shaping element as sot forth in claim 1, further having:
another set of diffraction gratings on a reverse surface thereof, on which the set of diffraction gratings is not provided,
one of the two sets of diffraction gratings expanding a light beam entering thereto and radiating the light beam thus expanded, and the other of the two sets of diffraction gratings reducing the light beam entering thereto and radiating the light beam thus reduced.

4. A beam shaping element as set forth in claim 1, further having:
a cylindrical lens on a reverse side thereof, on which the set of diffraction gratings is not provided,
one of the set of diffraction gratings and the cylindrical lens expanding a light beam entering thereto and radiating the light beam thus expanded, and the other of the set of diffraction gratings and the cylindrical lens reducing the light beam entering thereto and radiating the light beam thus reduced.

5. The beam shaping element as set forth in claim 1, wherein:
the set of diffraction gratings has astigmatism corresponding to amount of displacement of a light emitting point of a light source in the direction in which each grating-shaped pattern extends and in a direction being orthogonal thereto; and
the astigmatism changes along the direction in which each grating-shaped pattern extends, within a range including at least inter-individual errors in the amount of displacement of the light emitting point of the light source.

6. A beam shaping element having, on one surface thereof a set of diffraction gratings that are spaced from each other in a first direction and that extend in a second direction, the second direction being primarily along one axis that is perpendicular to an optical axis and wherein:
the first direction is perpendicular to the second direction,
the diffraction gratings are spaced from each other in the first direction in such a manner that intervals between the diffraction gratings farer from a vicinity of the optical axis and nearer to a periphery are narrower, and
each interval between respective diffraction gratings in the first direction also monotonously gradually increases or monotonously gradually decreases along the second direction in which each grating-shaped pattern extends, wherein the grating-shaped patterns are asymmetric with the first direction therebetween.

7. A beam shaping element having, on one surface thereof a set of diffraction gratings that extend in a direction primarily along one axis that is perpendicular to an optical axis and in such a manner that intervals between the gratings farer from a vicinity of the optical axis and nearer to a periphery are narrower, wherein:
each interval between the respective gratings monotonously increases or monotonously decreases along the direction in which each grating-shaped pattern extends;
the set of diffraction gratings has a plurality of grating-shaped patterns arranged in axial symmetry; and
a shape of a foot of a k-th grating-shaped pattern counted from a grating-shaped pattern nearest to a Y-axis is described by the following Equation:

[Equation 7] (1)

$$f(x, y, k) = \sum_{n=0}^{N} \sum_{m=0}^{M} a_{nm} x^{2n} y^m - b|k| = 0$$

where the set of diffraction gratings is a coordinate plane; the Y-axis is an axis of symmetry of the plurality of grating-shaped patterns; the X-axis is an axis that is orthogonal to the Y-axis on the coordinate plane; $a_{00}=0$; $a_{nm}$ is constant; b is a wavelength of a light beam entering the diffraction gratings; k=±1, ±2, ±3, . . . ; both N and M are positive integer numbers; $a_{nm}$, N, and M are values of aberration that does not exceed 0.02 λrms.

8. The beam shaping element as set forth in claim 6, further having:
   another set of diffraction gratings on a reverse side thereof, on which the set of diffraction gratings is not provided,
   one of the two sets of diffraction gratings expanding a light beam entering thereto and radiating the light beam thus expanded, and the other of the two sets of diffraction gratings reducing the light beam entering thereto and radiating the light beam thus reduced.

9. The beam shaping element as set forth in claim 6, further having:
   a cylindrical lens on a reverse side thereof, on which the set of diffraction gratings is not provided,
   one of the set of diffraction gratings and the cylindrical lens expanding light beam entering thereto and radiating the light beam thus expanded, and the other of the set of diffraction gratings and the cylindrical lens reducing the light beam entering thereto and radiating the light beam thus reduced.

10. The beam shaping element as set forth in claim 6, wherein:
    the set of diffraction gratings has astigmatism corresponding to amount of displacement of a light emitting point of a light source in the direction in which each grating-shaped pattern extends and in a direction being orthogonal thereto; and
    the astigmatism changes along the direction in which each grating-shaped pattern extends, within a range including at least inter-individual errors in the amount of displacement of the light emitting point of the light source.

11. A positional adjustment method comprising the step of:
    relatively moving a light source along a second direction of a plane of a beam shaping element while keeping constant distance between (a) the plane of the beam shaping element and (b) the light source for radiating a light beam into the beam shaping element, so as to correct displacement of a light emitting point,
    wherein the beam shaping element includes a set of diffraction gratings on one surface thereof that extend in a second direction that is primarily along one axis that is perpendicular to an optical axis mid in such a manner that intervals between the gratings in a first direction farer from a vicinity of the optical axis and nearer to a periphery are narrower, the first direction being perpendicular to the second direction, and
    wherein each interval between the respective gratings also gradually changes along the second direction in which each grating-shaped pattern extends, wherein the grating-shaped patterns are asymmetric with the first directing therebetween.

12. A positional adjustment method comprising the step of:
    relatively moving a light source along a second direction of a plane of a beam shaping element while keeping constant distance between (a) the plane of the beam shaping element and (b) the light source for radiating a light beam into the beam shaping element, so as to correct displacement of a light emitting point, and wherein:
    the beam shaping element includes a set of diffraction gratings on one surface thereof that extend in a second direction that is primarily along one axis that is perpendicular to an optical axis and in such a manner that intervals between the gratings in a first direction farer from a vicinity of the optical axis and nearer to a periphery are narrower, wherein the first direction is perpendicular to the second direction, and wherein each interval between the respective gratings also monotonously gradually increases or monotonously gradually decreases along the second direction in which each grating-shaped pattern extends wherein the grating-shaped patterns are asymmetric with the first direction therebetween.

13. A light source unit comprising:
    a beam shaping element having, on one surface thereof, a set of diffraction gratings that extend in a second direction that is primarily along one axis that is perpendicular to an optical axis and in such a manner that intervals between the gratings in a first direction farer from a vicinity of the optical axis and nearer to a periphery are narrower, wherein the first direction is perpendicular to the second direction, and wherein each interval between the respective gratings also gradually changes along the second direction in which each grating-shaped pattern extends, wherein the grating-shaped patterns are asymmetric with the first direction therebetween; and
    a light source for radiating a light beam into the beam shaping element,
    at least one of positions of the beam shaping element and the light source being adjusted by a positional adjustment method including the step of relatively moving the light source along a second direction of a plane of the beam shaping element while keeping constant distance between the plane of the beam shaping element and the light source, so as to correct displacement of a light emitting point.

14. A light source unit comprising:
    a beam shaping element having, on one surface thereof, a set of diffraction gratings that extend in a second direction that is primarily along one axis that is perpendicular to an optical axis and in such a manner that intervals between the gratings farer in a first direction from a vicinity of the optical axis and nearer to a periphery are narrower, wherein the first direction is perpendicular to the second direction, and wherein each interval between the respective gratings also monotonously increases or monotonously decreases along the second direction in which each grating-shaped pattern extends, wherein the grating-shaped patterns are asymmetric with the first direction therebetween; and
    a light source for radiating a light beam into the beam shaping element,
    at least one of positions of the beam shaping element and the light source being adjusted by a positional adjustment method including the step of relatively moving the light source along a second direction of a plane of the beam shaping element while keeping constant distance between the plane of the beam shaping clement and the light source, so as to correct displacement of a light emitting point.

15. An optical pickup comprising:
    a light source for radiating a light beam in an elliptical shape;
    a beam shaping element for shaping the light beam received from the light source into a substantially round shape, having, on one surface thereof, a set of diffraction gratings that extend in a second direction that is primarily along one axis that is perpendicular to an optical axis and in such a manner that intervals between the gratings in a first direction farer from a vicinity of the optical axis and nearer to a periphery are narrower, wherein the first direction is perpendicular to the second direction, and wherein each interval between the respective gratings also gradually changes along the second direction in which each grating-shaped pattern extends, wherein the grating-shaped patterns are asymmetric with the first direction therebetween;

a collimating means for parallelizing the light beam shaped into the substantially round shape by the beam shaping element; and a condensing means for condensing the light beam parallelized by the collimating means.

16. An optical pickup comprising:

a light source for radiating a light beam in an elliptical shape;

a beam shaping element for shaping the light beam received from the light source into a substantially round shape, having, on one surface thereof, a set of diffraction gratings that extend in a second direction that is primarily along one axis that is perpendicular to an optical axis and in such a manner that intervals between the gratings farer from a vicinity of the optical axis and nearer to a periphery are narrower, wherein the first direction is perpendicular to the second direction, and wherein each interval between the respective gratings monotonously gradually increases or monotonously gradually decreases along the direction in which each grating-shaped pattern extends, wherein the grating-shaped patterns are asymmetric with the first direction therebetween;

a collimating means for parallelizing the light beam shaped into the substantially round shape by the beam shaping element; and a condensing means for condensing the light beam parallelized by the collimating means.

17. A beam shaping element as set forth in claim 1, wherein the first direction is perpendicular to the second direction and a center of each grating-shaped pattern is an original point.

18. A beam shaping element as set forth in claim 1, wherein each interval between the gratings disposed in the first direction changes also along the second direction in which each grating-shaped pattern extends.

19. A beam shaping element as set forth in claim 6, wherein the first direction is perpendicular to the second direction and a center of each grating-shaped pattern is an original point.

20. A beam shaping element as set forth in claim 6, wherein each interval between the gratings disposed in the first direction changes also along the second direction in which each grating-shaped pattern extends.

21. A beam shaping element as set forth in claim 6, wherein each interval between respective diffraction gratings in the first direction one of monotonously increases or monotonously decreases along the second direction in which each grating-shaped pattern extends.

* * * * *